US012326234B2

(12) United States Patent
Okubo

(10) Patent No.: US 12,326,234 B2
(45) Date of Patent: Jun. 10, 2025

(54) LAMP UNIT AND VEHICLE LIGHTING TOOL

(71) Applicant: Ichikoh Industries, Ltd., Isehara (JP)

(72) Inventor: Yasuhiro Okubo, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/708,820

(22) PCT Filed: Nov. 10, 2022

(86) PCT No.: PCT/JP2022/041843
§ 371 (c)(1),
(2) Date: May 9, 2024

(87) PCT Pub. No.: WO2023/085344
PCT Pub. Date: May 19, 2023

(65) Prior Publication Data

US 2025/0003566 A1 Jan. 2, 2025

(30) Foreign Application Priority Data

Nov. 12, 2021 (JP) ................................ 2021-184659

(51) Int. Cl.
*F21S 43/20* (2018.01)
*F21S 43/14* (2018.01)
(Continued)

(52) U.S. Cl.
CPC ......... *F21S 43/26231* (2024.05); *F21S 43/14* (2018.01); *F21S 43/255* (2018.01); (Continued)

(58) Field of Classification Search
CPC ........... F21S 43/26231; F21S 43/26421; F21S 43/14; F21S 43/255
See application file for complete search history.

(56) References Cited

U.S. PATENT DOCUMENTS

2003/0107901 A1* 6/2003 Tokoro .................. F21S 41/275 362/539
2019/0226658 A1* 7/2019 Kawai ..................... F21S 41/43
(Continued)

FOREIGN PATENT DOCUMENTS

JP 2003-123519 A 4/2003
JP 2007-12316 1/2007
(Continued)

OTHER PUBLICATIONS

International Search Report mailed Jan. 24, 2023 in PCT/JP2022/041843 filed on Nov. 10, 2022, 2 pages.
(Continued)

*Primary Examiner* — Christopher E Dunay
(74) *Attorney, Agent, or Firm* — Oblon, McClelland, Maier & Neustadt, L.L.P.

(57) ABSTRACT

Provided are a lamp unit that can form an irradiation pattern on a road surface almost without tilting an inclination of a lamp unit axis with respect to the road surface, and a vehicle lighting tool using the lamp unit. A lamp unit includes: a light source; a condenser lens that condenses light from the light source; a light-shielding member (shade) provided with an irradiation slit through which the light condensed by the condensing lens partially passes; and a projection lens that projects the light that passes through the light-shielding member (shade) to form an irradiation pattern, which are arranged along a lamp unit axis. The projection lens has a reference focus set on the lamp unit axis, and is disposed at such a position rotated downward about the reference focus, and a projection lens axis is directed further downward than the lamp unit axis.

9 Claims, 10 Drawing Sheets

(51) Int. Cl.
*F21W 103/60* (2018.01)
*F21Y 115/10* (2016.01)

(52) U.S. Cl.
CPC .... *F21S 43/26421* (2024.05); *F21W 2103/60* (2018.01); *F21Y 2115/10* (2016.08)

(56) References Cited

U.S. PATENT DOCUMENTS

| | | | | |
|---|---|---|---|---|
| 2022/0221123 | A1* | 7/2022 | Okubo | F21S 43/20 |
| 2022/0373149 | A1* | 11/2022 | Okubo | F21S 41/265 |
| 2023/0041578 | A1* | 2/2023 | Hamamoto | F21S 43/14 |
| 2023/0382289 | A1* | 11/2023 | Watano | H04N 23/74 |
| 2024/0102627 | A1* | 3/2024 | Kitazawa | B60Q 1/46 |
| 2024/0310021 | A1* | 9/2024 | Kitazawa | F21S 43/15 |

FOREIGN PATENT DOCUMENTS

| | | | |
|---|---|---|---|
| JP | 2013-161536 | | 8/2013 |
| JP | 2019-192349 | A | 10/2019 |
| JP | 2020-102332 | A | 7/2020 |
| JP | 2020-205237 | A | 12/2020 |
| JP | 2021-133894 | A | 9/2021 |
| JP | 2021-153024 | | 9/2021 |
| WO | WO 2020/064086 | A1 | 4/2020 |

OTHER PUBLICATIONS

Japanese Notice of Reasons for Refusal issued Oct. 15, 2024 in Japanese Patent Application No. 2021-184659 with English translation, 8 pgs.

Office Action mailed Mar. 18, 2025, in Japanese Application No. 2021-184659 filed Nov. 12, 2021 (w/English translation—citing document Nos. 15-18 therein).

* cited by examiner

LAMP UNIT AND VEHICLE LIGHTING TOOL

TECHNICAL FIELD

The present disclosure relates to a lamp unit and a vehicle lighting tool.

BACKGROUND ART

As vehicle lighting tools, vehicle lighting tools that use lamp units to form irradiation patterns on a road surface around a vehicle are considered (see PLT 1, PLT 2, and the like, for example). These conventional lamp units each form an irradiation pattern by projecting light from a light source through an irradiation slit of a light-shielding member (shade) with a projection lens, and can inform a viewer of intention expressed by the irradiation pattern.

CITATION LIST

Patent Literature

PTL 1: Japanese Patent Application Laid-Open No. 2020-102332
PTL 2: Japanese Patent Application Laid-Open No. 2019-192349

SUMMARY OF THE INVENTION

Problems to be Solved by the Invention

In the vehicle lighting tool, it is considered that a lamp unit is provided side by side with a signal lighting unit such as a turn lamp, as a single lighting tool. A signal lighting unit axis of the signal lighting unit is parallel to the road surface such that a person around the vehicle can directly recognize the light.

However, the conventional vehicle lighting tool forms an irradiation pattern on the road surface by tilting the lamp unit axis of the lamp unit, which is combination of a light source, a light-shielding member, and a projection lens, downward toward the road surface. Therefore, in the conventional vehicle lighting tool, even when the lamp unit and the signal lighting unit are tried to be provided together, the lamp unit and the signal lighting unit interfere with each other because the lamp unit and the signal lighting unit are oriented in the different directions, so that it becomes difficult to provide the lamp unit and the signal lighting unit side by side.

The present disclosure has been made in view of the above circumstances, and an object of the present disclosure is to provide a lamp unit capable of forming an irradiation pattern on a road surface almost without tilting an inclination of a lamp unit axis with respect to the road surface, and a vehicle lighting tool using the lamp unit.

Means for Solving the Problem

A lamp unit lamp includes: a light source; a condenser lens that condenses light from the light source; a light-shielding member provided with an irradiation slit through which the light condensed by the condensing lens partially passes; and a projection lens that projects the light which passes through the light-shielding member to form an irradiation pattern, the light source, the condenser lens, the light-shielding member, and the projection lens being arranged along a lamp unit axis, wherein the projection lens has a reference focus set on the lamp unit axis, and is disposed at such a position rotated downward about the reference focus, and a projection lens axis is directed further downward than the lamp unit axis.

Effect of the Invention

According to a lamp unit of the present disclosure and a vehicle lighting tool using the lamp unit, it is possible to form an irradiation pattern on a road surface almost without tilting an inclination of a lamp unit axis with respect to the road surface.

MODE FOR CARRYING OUT THE INVENTION

Figure 1:
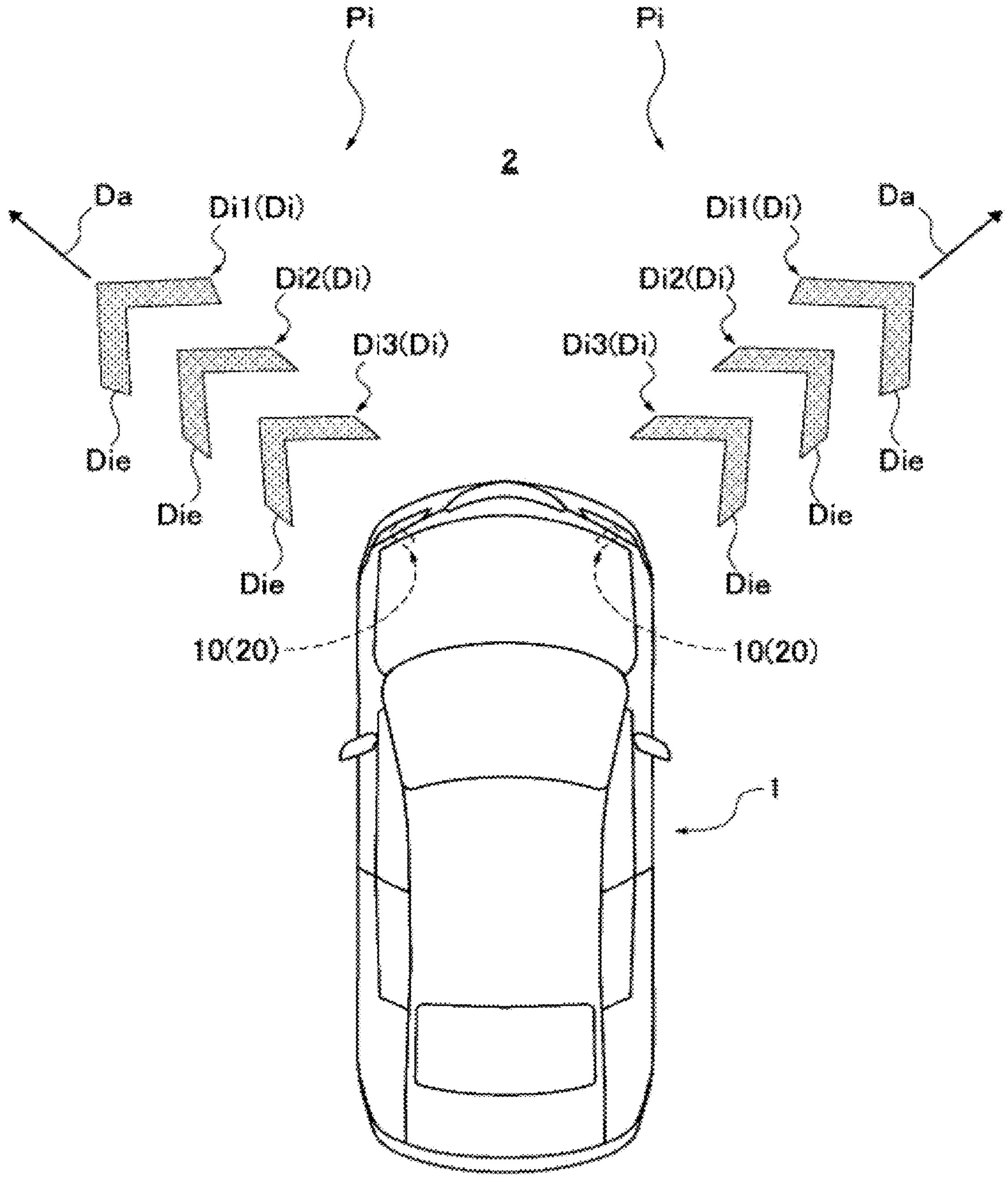
FIG. 1 is an explanatory diagram illustrating a state in which vehicle lighting tools of Embodiment 1 according to the present disclosure are mounted on a vehicle and each forms an irradiation pattern.

Hereinafter, each embodiment of a lamp unit 20 and a vehicle lighting tool 10, which are examples of a lamp unit and a vehicle lighting tool according to the present disclosure, will be described with reference to the drawings. In FIG. 1, the vehicle lighting tool 10 is emphasized compared to a vehicle 1 in order to facilitate understanding of a state in which the vehicle lighting tool 10 is provided, and the state in FIG. 1 does not necessarily coincide with an actual state. In addition, in FIG. 8, FIG. 9, FIG. 10, and FIG. 14, in order to facilitate understanding of a state in which light travels, hatches that indicate cross sections of a condenser lens and a projection lens are omitted, and a shade frame part is omitted in a shade.

Embodiment 1

The vehicle lighting tool 10 (lamp unit 20) of Embodiment 1 is described with reference to FIG. 1 to FIG. 11. As illustrated in FIG. 1, the vehicle lighting tools 10 of Embodiment 1 are each used as a lighting tool for the vehicle 1 such as a car, and are each provided at a front part of the vehicle 1 in order to form an irradiation pattern Pi on a road surface 2 around the front of the vehicle 1, apart from headlights provided on the vehicle 1. The surrounding area in front of the vehicle 1 necessarily includes a proximity area that is closer to the vehicle 1 than a headlight area irradiated by each headlight provided on the vehicle 1, and sometimes partially includes each headlight area. Each vehicle lighting tool 10 may also form the irradiation pattern Pi on the road surface 2 around the rear and the sides of the vehicle 1, and is not limited to a configuration of Embodiment 1.

Figure 2:
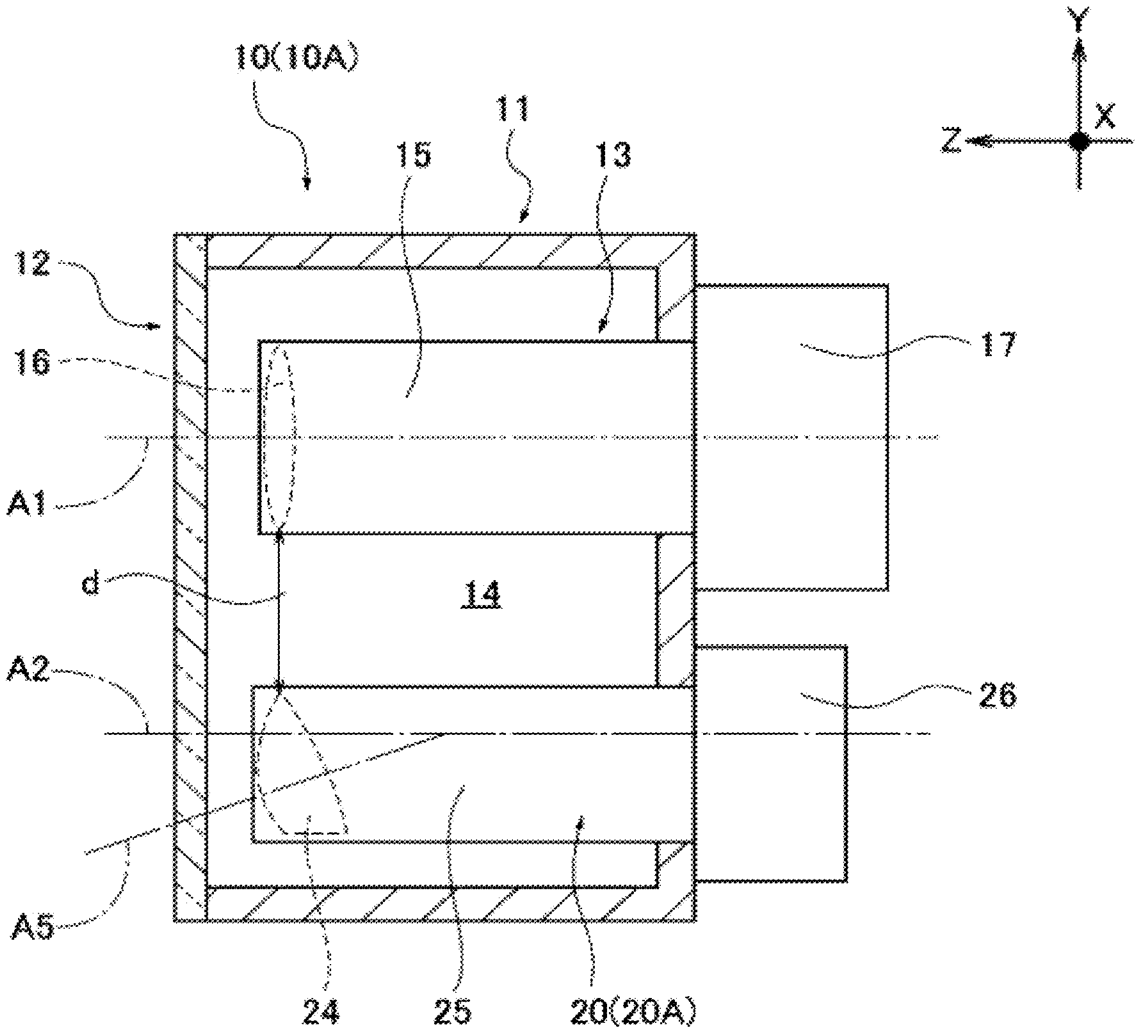
FIG. 2 is an explanatory diagram illustrating a configuration of the vehicle lighting tool.

In Embodiment 1, each vehicle lighting tool 10 constitutes a signal light such as a turn lamp and a back lamp provided on the vehicle 1, and in Embodiment 1, the vehicle lighting tools 10 are turn lamps and are provided in pairs on the left and right on the front side of the vehicle 1. The vehicle lighting tools 10 can also constitute other signal lights such as clearance lamps, back lamps (stop lamps), and tail lamps, and are not limited to those in Embodiment 1. The two vehicle lighting tools 10 have basically the same configuration, except for differences in a mounting position and a position where the irradiation pattern Pi is formed, and therefore will be described below simply as the vehicle lighting tool 10. This vehicle lighting tool 10 includes a lamp housing 11, a lamp lens 12, a signal lighting unit 13, and the lamp unit 20, as illustrated in FIG. 2.

The lamp housing 11 is made of a light-non-transmissive member such as colored or painted resin material, and is open at the front and closed at the rear. The lamp lens 12 is made of a light-transmissive member such as a transparent resin member and a glass member, and can cover an open front end of the lamp housing 11. The lamp lens 12 is sealed and fixed in the opening of the lamp housing 11, and ensures watertightness. A lighting room 14 is formed by section of the lamp housing 11 and the lamp lens 12.

In this lighting room 14, the signal lighting unit 13 and the lamp unit 20 are disposed so as to be fixed to the lamp housing 11 and the like. The signal lighting unit 13 is configured such that optical members such as a light source (not illustrated) are provided on a signal lighting unit axis A1 in the signal lighting housing 15, and a signal lighting light-emitting part 16 is provided at a front end on the signal lighting unit axis A1, and a signal lighting radiation part 17 is provided at a rear end. The signal lighting unit 13 is turned on and off as appropriate by being supplied with power from a lighting control circuit. In Embodiment 1, the signal lighting unit 13 is a turn lamp, and therefore blinks at regular intervals when turned on. This signal lighting unit 13 is provided such that the signal lighting unit axis A1 is parallel to the road surface 2, and visibility for a person around the vehicle 1 is ensured.

The lamp unit 20 is provided below the signal lighting unit 13. In the following description, for the lamp unit 20, the direction in which a lamp unit axis A2 extends is defined as the axial direction (Z in the drawing), the vertical direction when the axial direction is along a horizontal plane is defined as the up and down direction (Y in the drawing), and the direction orthogonal to the axial direction and the up and down direction is defined as the width direction (X in the drawing) (see FIG. 2 and the like).

Figure 3:
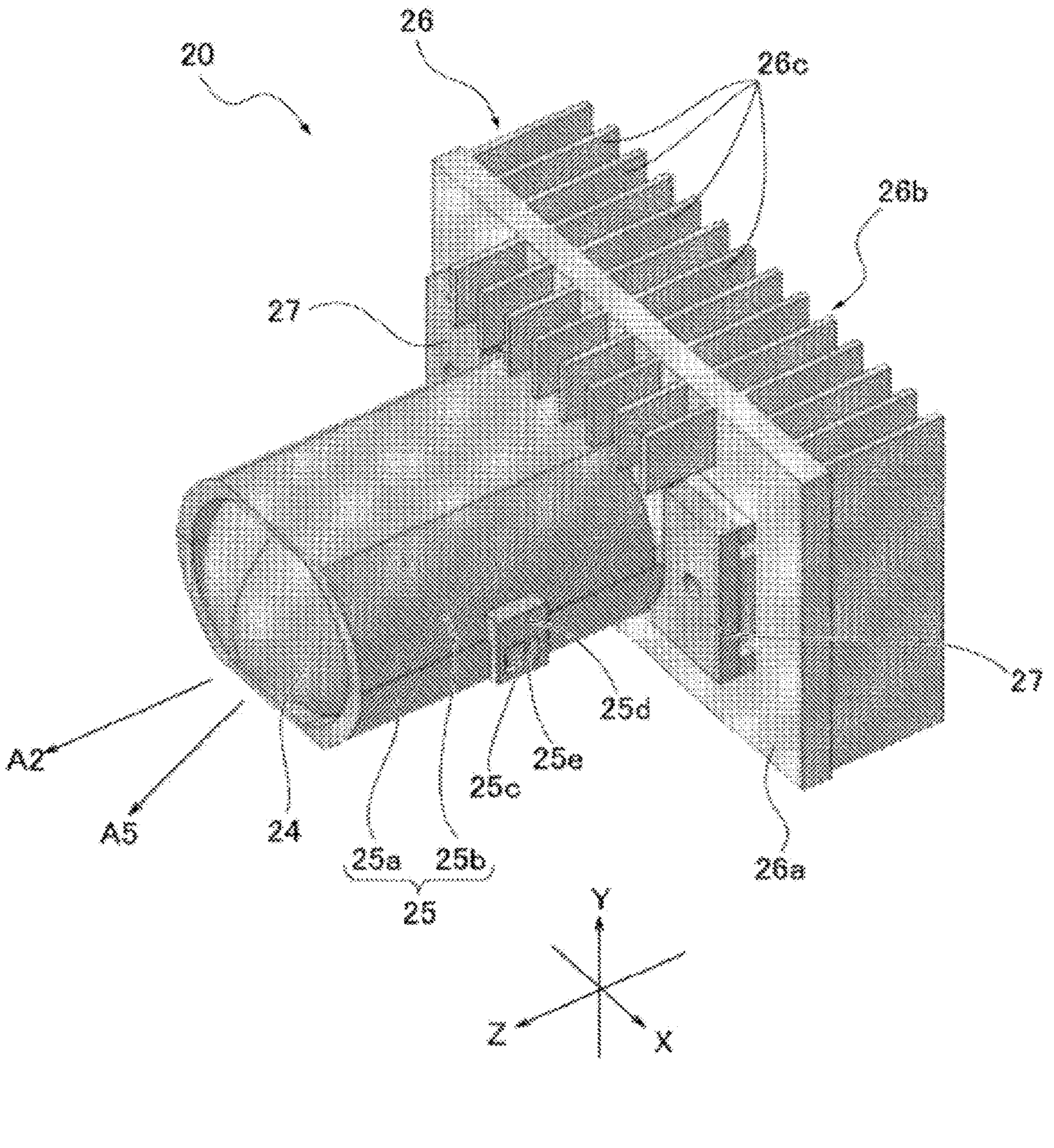
FIG. 3 is an explanatory diagram illustrating a configuration of a lamp unit of the vehicle lighting tool.
Figure 4:
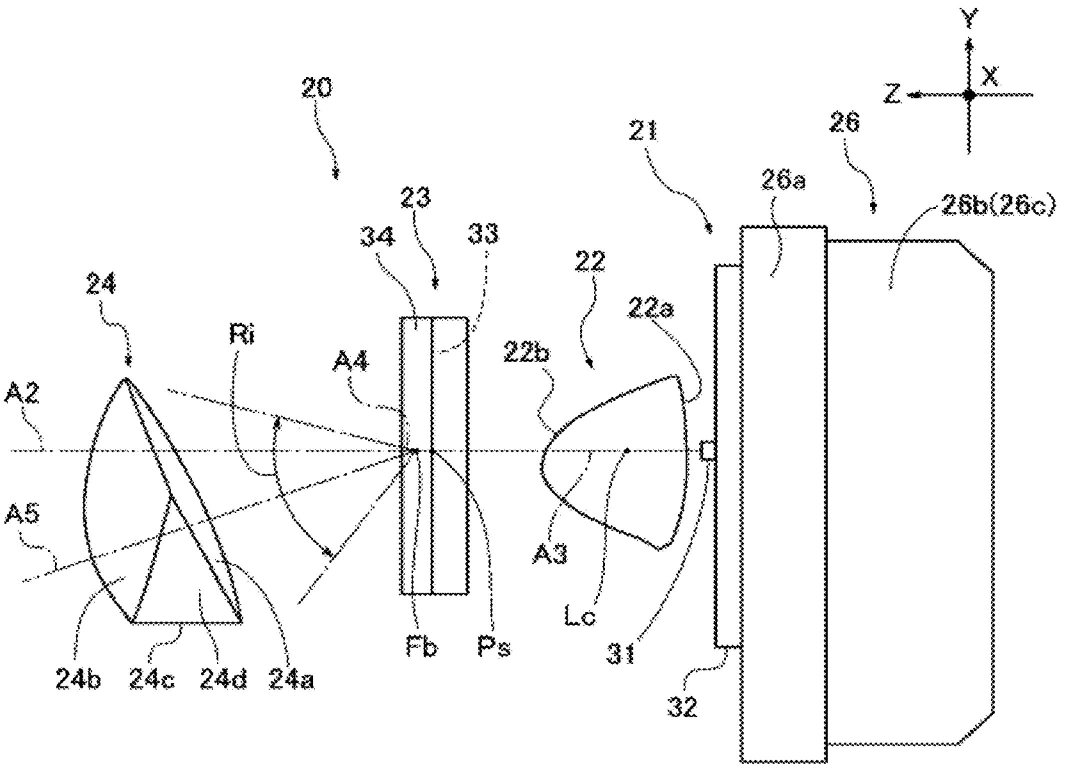
FIG. 4 is an explanatory diagram illustrating a configuration of the lamp unit with a housing omitted.

As illustrated in FIG. 3 and FIG. 4, the lamp unit 20 has a light source part 21, a condenser lens 22, a shade 23, and a projection lens 24 located on a lamp unit axis A2 and housed in a light source housing 25 to form a single projection optical system, and constitute a project type road surface projection unit. The light source housing 25 is composed of a semi-cylindrical lower member 25*a* and a semi-cylindrical upper member 25*b*. In a state in which each of the above members (22 to 24) is installed on the lower member 25*a*, the lower member 25*a* and the upper member 25*b* are fitted together, and is mounted on an installation stand 26. In the light source housing 25, a central axis line of the cylindrical shape formed by the fitted lower member 25*a* and upper member 25*b* is defined as the lamp unit axis A2, and serves a reference line on which each of the above members (22 to 24) is installed. In this light source housing 25, a condenser lens groove into which the condenser lens 22 is fitted, a shade groove into which the shade 23 is fitted, and a projection lens groove into which the projection lens 24 is fitted are provided. In addition, in the light source housing 25, fixing protrusions 25*c* are provided in pairs in the width direction on the lower member 25*a*, and fixing pieces 25*d* are provided in pairs in the width direction on the upper member 25*b* (only both on the front side are illustrated in FIG. 3), so that the fixing protrusions 25*c* and the fixing holes 25*e* of the fixing pieces 25*d* can be fitted. The configuration such as the shape of light source housing 25 may be set as appropriate and is not limited to the configuration of Embodiment 1.

The installation stand 26 is a location where the light source part 21 is provided, and is made of aluminum die cast or resin that has thermal conductivity, and functions as a heat sink that releases heat generated by the light source part 21 to the outside, as a whole. The installation stand 26 has an installation location 26*a* and a heat radiation location 26*b*. The installation location 26*a* is a location where the light source part 21 (its substrate 32) is installed, and is formed in a flat plate orthogonal to the axial direction. At the installation location 26*a*, the light source housing 25 in which the lower member 25*a* and the upper member 25*b* are fitted is mounted via a pair of mounting pieces 27 disposed with the light source part 21 therebetween in the width direction. The radiation location 26*b* has a plurality of radiation fins 26*c* consecutively provided at the installation location 26*a*. The radiation location 26*b* mainly radiates heat generated by the light source part 21 installed at the installation location 26*a* to the outside from each radiation fin 26*c*.

Figure 5:
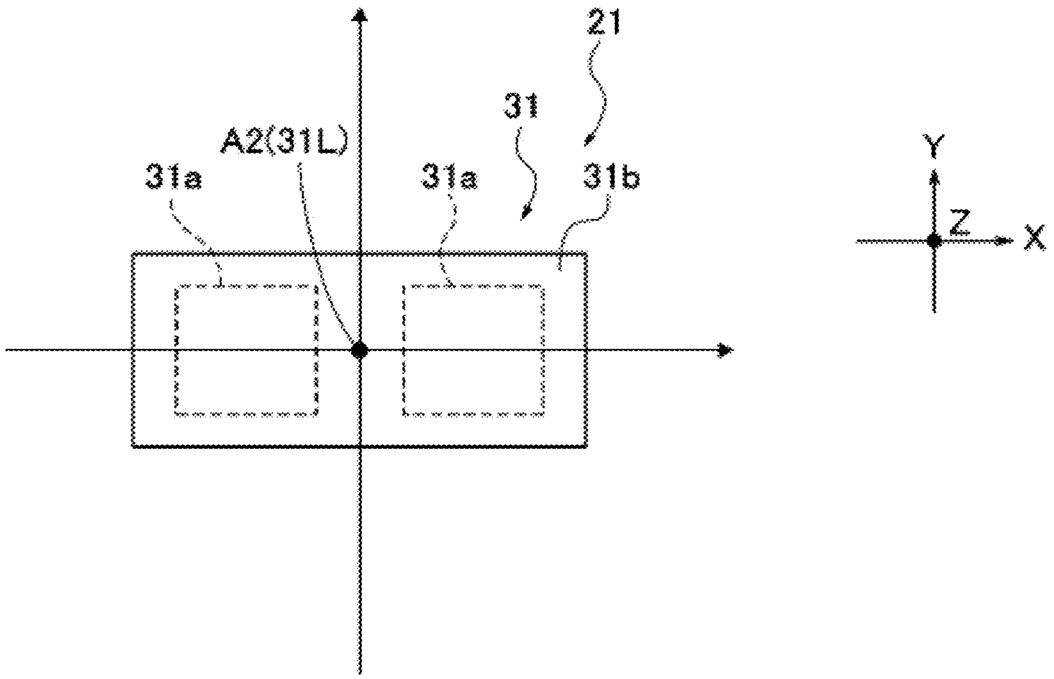
FIG. 5 is an explanatory diagram illustrating a configuration and positional relationship of a light source.

The light source part 21 has a light source 31 and the substrate 32 on which the light source 31 is mounted. The light source 31 is composed of light emitting elements such as LEDs (Light Emitting Diodes). In Embodiment 1, the light source 31 emits amber light with a Lambertian distribution centered on an emission optical axis. The color (wavelength band), the distribution mode, the number of colors, or the like of the light source 31 can be set as appropriate, and is not limited to the configuration of Embodiment 1. As illustrated in FIG. 5, the light source 31 of Embodiment 1 has two LED chips 31*a* disposed in parallel in the width direction and a phosphor material 31*b* that covers the LED chips 31*a*, and light from each LED chip 31*a* passes through the phosphor material 31*b* to emit as amber light. Therefore, in the light source 31, the phosphor material 31*b* functions as a light emitting surface. In the light source 31, the phosphor material 31*b* has a long rectangular shape in the width direction, and an emission optical axis 31L is set by extending from the center in the axial direction. The light source 31 of Embodiment 1 has the emission optical axis 31L aligned with the lamp unit axis A2 on the substrate 32.

The substrate 32 is mounted on the installation location 26*a* of the installation stand 26, and the light source 31 is installed. The substrate 32 is provided with the lighting control circuit, which supplies power appropriately to the light source 31 to turn on the light source 31. The light source housing 25 is connected to the installation location 26*a* as described above, so that the substrate 32 is located at a rear end of the light source housing 25 (an end on the installation stand 26 side in the axial direction), and faces the condenser lens 22 (its incident surface 22*a*) housed in the light source housing 25.

The condenser lens 22 condenses light emitted from the light source 31, and condenses the light on an area around slit parts 36 described later on the shade 23, that is, an area (setting area As (see FIG. 6)) where the slit parts 36 later are provided while including all the slit parts 36 on the shade 23. The condenser lens 22 is basically a convex lens, as illustrated in FIG. 4. In Embodiment 1, the condenser lens 22 is a double-convex lens with the incident surface 22*a* and a light emission surface 22*b* being free-form surfaces. Optical setting for the condenser lens 22 will be discussed later. In the condenser lens 22, flange parts provided at both ends in the width direction can be fitted into the condenser lens groove of the light source housing 25. The condenser lens 22 has a condenser lens axis A3 that extends in the axial direction. The condenser lens axis A3 is an axis line that passes through a lens center point Lc of the condenser lens 22 and extends in the axial direction. When the condenser lens 22 is fitted into the condenser lens groove, the condenser lens axis A3 is aligned with the lamp unit axis A2. As long as the incident surface 22*a* and the light emission surface 22*b* form the condenser lens 22 that is a convex lens, and meet optical setting described below, the incident surface 22*a* and the light emission surface 22*b* may be each a convex surface or a concave surface and are not limited to the configuration of Embodiment 1.

The shade 23 is an example of a light-shielding member that forms the irradiation pattern Pi by partially passing light from the light source 31 that is condensed by the condenser lens 22. As illustrated in FIG. 1, each irradiation pattern Pi has three irradiation designs Di aligned in the direction away from the vehicle 1 with substantially equal intervals. Herein, when illustrating each irradiation design Di individually, the irradiation design Di furthest from the vehicle 1 is defined as a first irradiation design Di1, and the irradiation design Di closer toward the vehicle 1 in order are defined as a second irradiation design Di2 and a third irradiation design Di3. Therefore, in the irradiation pattern Pi, the first irradiation design Di1 becomes a far irradiation design, the third irradiation design Di3 becomes a near irradiation design, and the second irradiation design Di2 between the first irradiation design and the third irradiation design becomes an intermediate irradiation design. In Embodiment 1, each irradiation design Di is a wide open V-shaped symbol, and the first irradiation design Di1 is slightly larger than the other two irradiation designs Di2 and Li3.

The direction in which respective vertices of the V-shapes of the irradiation designs Di are lined up is defined as the arrow direction Da, and the pointed side (first irradiation design Di1 side) is defined as the front side in the arrow direction Da. The three irradiation designs Di are lined up, so that the irradiation pattern Pi can be made to look like an arrow pointing the arrow direction Da from the vehicle 1. The irradiation pattern Pi has the first irradiation design Di1, the second irradiation design Di2, and the third irradiation design Di3 elongated in the direction orthogonal to the arrow direction Da on the road surface 2 which is a projection surface.

Herein, in the first irradiation design Di1, two side edges Die located in the direction orthogonal to the arrow direction Da are straight lines inclined inward as the two side edges Die go toward the rear side in the arrow direction Da (toward the side close to the vehicle), that is, are inclined inward with respect to the arrow direction Da. Additionally, in the second irradiation design Di2 and the third irradiation design Di3, both side edges Die are parallel to the arrow direction Da. Therefore, the irradiation pattern Pi can give the impression that the first irradiation design Di1 corresponds to an arrowhead in an arrow symbol, and the remaining two irradiation designs Di correspond to a shaft of the arrow symbol, and can more effectively give the impression pointing in the arrow direction Da. In addition, the irradiation pattern Pi can make a person located in front of either the left side or the right side of the vehicle 1 feel that both side edges Die of the first irradiation design Di1 is pointed toward the person, and the irradiation pattern Pi can make the person feel that there is an intention to turn the vehicle in the direction in which the person is located. The irradiation pattern Pi consisting of these three irradiation designs Di is formed by the shade 23.

Figure 6:
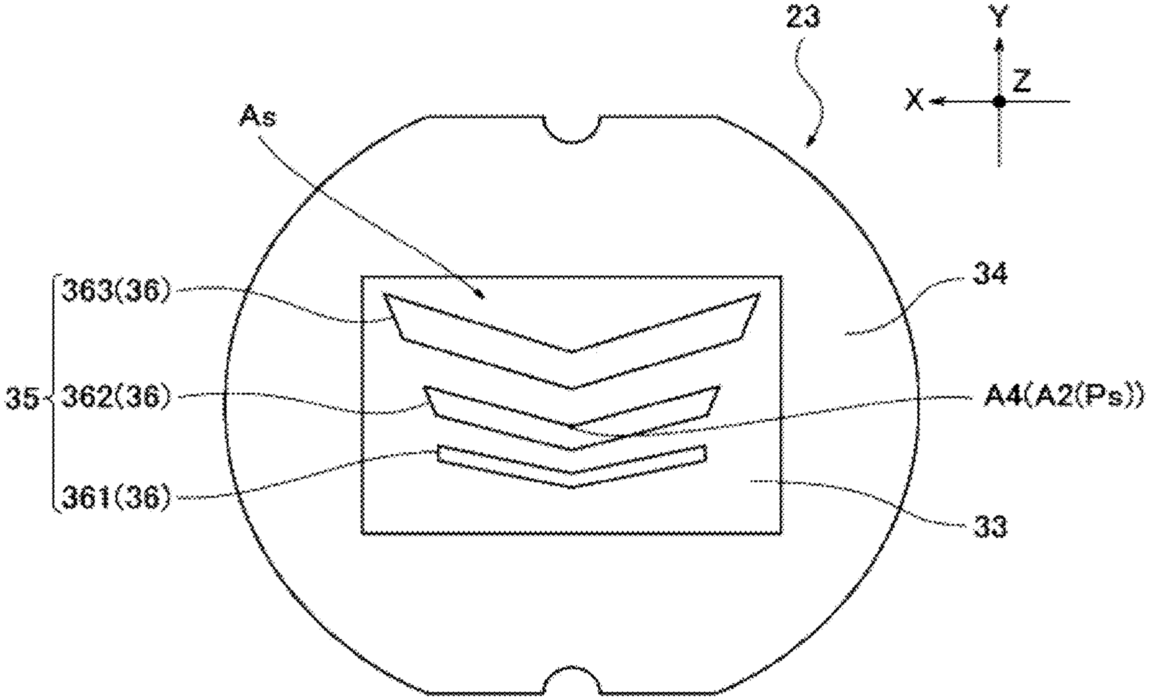
FIG. 6 is an explanatory diagram illustrating a shade.

The shade 23 has a shade part 33 and a shade frame part 34, as illustrated in FIG. 6. The shade frame part 34 has a substantially circular frame shape that surrounds the shade part 33, and can be fitted into the shade groove of the light source housing 25 to be mounted on the light source housing 25. In the shade frame part 34 of Embodiment 1, an upper end and a lower end in the up and down direction are partially cut out in the width direction. In the shade 23, a shade reference point Ps is set at a center position of the shade part 33, and a line passing through that shade reference point Ps and orthogonal to the shade part 33 is defined as a shade reference axis line A4. In the shade 23, the shade frame part 34 is mounted on the light source housing 25, so that the shade reference axis line A4 is aligned with the lamp unit axis A2, and the shade reference point Ps is located on the lamp unit axis A2.

The shade part 33 is basically formed of a plate-shaped member that blocks transmission of light, and the member is partially cut out to provide a penetrated irradiation slit 35. The irradiation slit 35 corresponds to the irradiation pattern Pi, and forms the irradiation pattern Pi into a predetermined shape by partially passing light emitted from the light source 31 and condensed by the condenser lens 22. The irradiation slit 35 is composed of three slit parts 36 in Embodiment 1.

These three slit parts 36 correspond to the three irradiation designs Di one-to-one. The projection lens 24 inverts the shade 23 (irradiation slit 35) and projects the shade 23 onto the road surface 2, and therefore each slit part 36 has rotationally symmetrical positional relationship with the shade reference axis line A4 (lamp unit axis A2) as the center with respect to the positional relationship of each irradiation design Di of the irradiation pattern Pi (see FIG. 1, FIG. 6 and the like). Therefore, among the slit parts 36, a lowest first slit part 361 in the up and down direction becomes a far slit part corresponding to the first irradiation design Di1 (far irradiation design) of the irradiation pattern Pi. In addition, in each slit part 36, a second slit part 362 above the first slit part becomes an intermediate slit part corresponding to the second irradiation design Di2 (intermediate irradiation design). In each slit part 36, an uppermost third slit part 363 becomes a near slit part corresponding to the third irradiation design Di3 (near irradiation design). In the shade 23 of Embodiment 1, in the up and down direction, the third slit part 363 is provided above the lamp unit axis A2, and below the third slit part 363, the second slit part 362 is provided across the horizontal line that includes the lamp unit axis A2, and below the second slit part 362, the first slit part 361 is provided. The light that passes through the shade 23 (each slit part 36 of the irradiation slit 35) is projected onto the road surface 2 by the projection lens 24.

Each of the slit parts 36 is shaped to imitate a wide open V-shaped symbol, similar to each corresponding irradiation design Di, and is inverted vertically and horizontally with respect to each irradiation design Di. The three slit parts 36 each have a position, a shape, a size and an interval on the shade part 33, which are set according to a distance to the road surface 2, such that each irradiation design Di on the road surface 2 has a size and an interval illustrated in FIG. 1. In detail, the lamp unit 20 (vehicle lighting tool 10) is provided at a position higher than the road surface 2, and each irradiation design Di is formed on the road surface 2 by arranging the irradiation designs Di in the arrow direction Da, and therefore the distance to the position on the road surface 2 forming each irradiation design Di corresponding to each slit part 36 is different. Therefore, each slit part 36 has a position, a shape, a size, and an interval according to the distance that each irradiation design Di, which is the light transmitted through the irradiation design Di, is projected onto the road surface 2 by the projection lens 24. Specifically, in Embodiment 1, the first slit part 361 is shaped to imitate a thin V-shaped symbol, the second slit part 362 is shaped to imitate a thicker V-shaped symbol than the first slit part 361, the third slit part 363 is thicker than the second slit part 362 and is shaped to imitate a V-shaped symbol, and the slit parts are more elongated in the width direction than the corresponding irradiation designs Di.

Thus, the three slit parts 36 are different from the respective irradiation designs Di, have different sizes, and have different intervals. In the slit parts 36, the first slit part 361 has the smallest reduction ratio to the corresponding irradiation design Di, and when light that passes through the first slit part 361 is projected onto the road surface 2, the first irradiation design Di1 is formed by being enlarged with the largest magnification ratio. In addition, in the slit parts 36, the third slit part 363 has the largest reduction ratio to the corresponding irradiation design Di, and when light that passes through the third slit part 363 is projected onto the road surface 2, the third irradiation design Di3 is formed by being enlarged with the smallest magnification ratio.

The projection lens 24 is basically a convex lens, as illustrated in FIG. 4. In Embodiment 1, an incident surface 24*a* and a light emission surface 24*b* are convex free-form surfaces, and the lower side in the up and down direction is cut out. The projection lens 24 forms the irradiation pattern Pi (see FIG. 1) on the road surface 2 by projecting the irradiation slit 35 (each slit part 36) of the shade 23. The incident surface 24*a* and the light emission surface 24*b* may be convex or concave, and are not limited to the configuration of Embodiment 1, as long as the projection lens 24 is a convex lens.

In this projection lens 24, a reference focus Fb is set on the lamp unit axis A2 and near the shade reference point Ps of the shade 23. This reference focus Fb is a location where the light is condensed when light parallel to a projection lens axis A5 of the projection lens 24 is incident from the light emission surface 24*b* side in a state in which the incident surface 24*a* and the light emission surface 24*b* are set as reference curved surfaces. Then, in the projection lens 24, the center line in a state in which the incident surface 24*a* and the light emission surface 24*b* are used as the reference curved surfaces is the projection lens axis A5. Herein, the incident surface 24*a* and the light emission surface 24*b* are free-form surfaces based on this standard curved surface, and even when parallel light like the one above is incident from the light emission surface 24*b* side, not all of that luminous flux necessarily passes through the reference focus Fb. In this projection lens 24, an incident range Ri from the reference focus Fb is within 35 degrees about the projection lens axis A5. In other words, the projection lens 24 is set such that the light traveling in the direction within 35 degrees to respect to the projection lens axis A5 passes through the reference focus Fb when the parallel light like the one above is incident from the light emission surface 24*b* side. The size (angle) of this incident range Ri can be set as appropriate and is not limited to the configuration of Embodiment 1.

The projection lens 24 is disposed in a state of being rotated (tilted) downward from the lamp unit axis A2, with a line passing through the reference focus Fb and extending in the width direction as the rotation center, and in Embodiment 1, the projection lens axis A5 is at a downward angle of 20 degrees with respect to the lamp unit axis A2. In addition, the projection lens 24 only needs to be disposed in the state of being rotated downward from the lamp unit axis A2, about the reference focus Fb set at the above position, and is limited to the configuration of Embodiment 1. The angle of the projection lens axis A5 with respect to the lamp unit axis A2 is preferably in the range of 15 degrees to 20 degrees.

Thus, in the projection lens 24, the projection lens axis A5 is tilted by 20 degrees downward from the reference focus Fb with the respect to lamp unit axis A2, and a range of 35 degrees from the reference focus Fb is set as the incident range Ri. Therefore, the projection lens 24 has the projection lens axis A5 that is tilted downward with respect to the lamp unit axis A2 so as to locate the lamp unit axis A2 within the incident range Ri from the reference focus Fb (moves downward in the up and down direction as the projection lens axis approaches toward the front in the axial direction). This projection lens 24 has the reference focus Fb located on the lamp unit axis A2 and located near the shade reference point Ps of the shade 23, and therefore an image of the irradiation slit 35 (each slit part 36) of the shade part 33 can be formed on the projection lens axis A5 with the least aberration according to optical setting of the project lens. Therefore, the projection lens 24 projects light that passes through the irradiation slit 35 (each slit part 36) of the shade 23, which has luminous flux distribution described below, to an area around a position where the light intersects with the projection lens axis A5 on the road surface 2.

Herein, the projection lens 24 is provided at a rotated position below the lamp unit axis A2 as described above, and therefore interferes with the cylindrical light source housing 25. In order to prevent this interference, the projection lens 24 has a lower end surface 24*c* formed by cutting out a lower end in the up and down direction, and curved surfaces 24*d* formed by cutting out side surfaces adjacent to the lower end surface 24*c*. The lower end surface 24*c* and the curved surfaces 24*d* are formed by partially cutting out portions of the projection lens 24, which interfere with the light source housing 25 (lower member 25*a*), and the lower end surface 24*c* is a flat surface located substantially at the same position as the lower end of the shade 23 in the up and down direction, and the curved surfaces 24*d* are curved surfaces that follow an inner surface of the light source housing 25 (lower member 25*a*). Consequently, it is possible to house the projection lens 24 inside the light source housing 25. When the projection lens 24 is fitted into the condenser lens groove of the light source housing 25, the projection lens 24 is mounted on the light source housing 25 in a state in which the projection lens axis A5 tilted downward with respect to the lamp unit axis A2, as illustrated above. The projection lens 24 has the positional relationship described above with respect to the shade 23 which is also fitted into the shade groove of the light source housing 25.

Now, optical setting of the condenser lens 22 will be described with reference to FIG. 8 to FIG. 10. In the condenser lens 22, the optical setting is made by appropriately setting curved surfaces of the incident surface 22*a* and the light emission surface 22*b*. The condenser lens 22 of Embodiment 1 condenses spread light emitted from the light source 31 as a whole, and irradiates the setting area As (see FIG. 6) in the shade 23. The setting area As is a range where the irradiation slit 35 (each slit part 36) are provided in the shade part 33 of the shade 23 in Embodiment 1.

Figure 7:
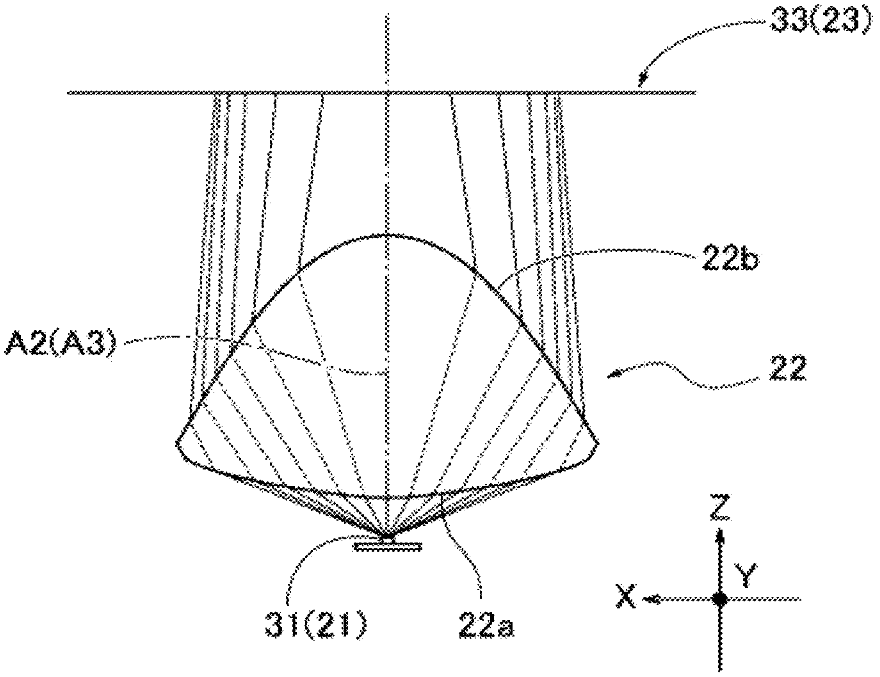
FIG. 7 is an explanatory diagram illustrating a state in which light from the light source travels from a condenser lens to the shade on a transverse section (horizontal section) in a lamp unit.

As illustrated in FIG. 7, in the transverse section including the axial direction and the width direction, the condenser lens 22 condenses the light emitted from the light source 31 between the light emission surface 22*b* and the shade 23 such that luminous flux passing through a vicinity of the lamp unit axis A2 (condenser lens axis A3) approaches the lamp unit axis A2, and luminous flux passing through a position separated from the lamp unit axis A2 is made parallel. That is, the condenser lens 22 makes the density of the luminous flux on the lamp unit axis A2 the highest in the transverse section, and gradually lowers the density of the luminous flux as the luminous flux goes away from the lamp unit axis A2. Herein, in FIG. 7, it seems that the luminous flux is concentrated at an outermost part away from the lamp unit axis A2, but this is because the luminous flux is illustrated evenly in order to facilitate understanding of the state of the luminous flux (light path), and the density of the luminous flux is actually gradually lowered as the luminous flux goes away from the lamp unit axis A2. In addition, the light from the light source 31 has a Lambertian distribution, and the closer the light gets to the lamp unit axis A2, the higher the density of the luminous flux, and therefore this also contributes to the fact that the most light is concentrated on the lamp unit axis A2.

In addition, the condenser lens 22 condenses the light from the light source 31 into the setting area As in a longitudinal section including the axial direction and the up and down direction. In this condenser lens 22, the light path from the light source 31, which travels from the light emission surface 22*b* to the shade 23, that is, the aspect of the luminous flux from light emission surface 22*b* to the shade 23 is set in accordance with the position of the irradiation slit 35 (each slit part 36). The condenser lens 22 satisfies at least one of a requirement that at least the light path (luminous flux) toward an upper part of the irradiation slit 35 is made parallel to the lamp unit axis A2, and a requirement that the light path (luminous flux) toward the upper part of the irradiation slit 35 is tilted downward so as to approach the lamp unit axis A2 as the light path (luminous flux) goes toward the irradiation slit 35.

Figure 8:
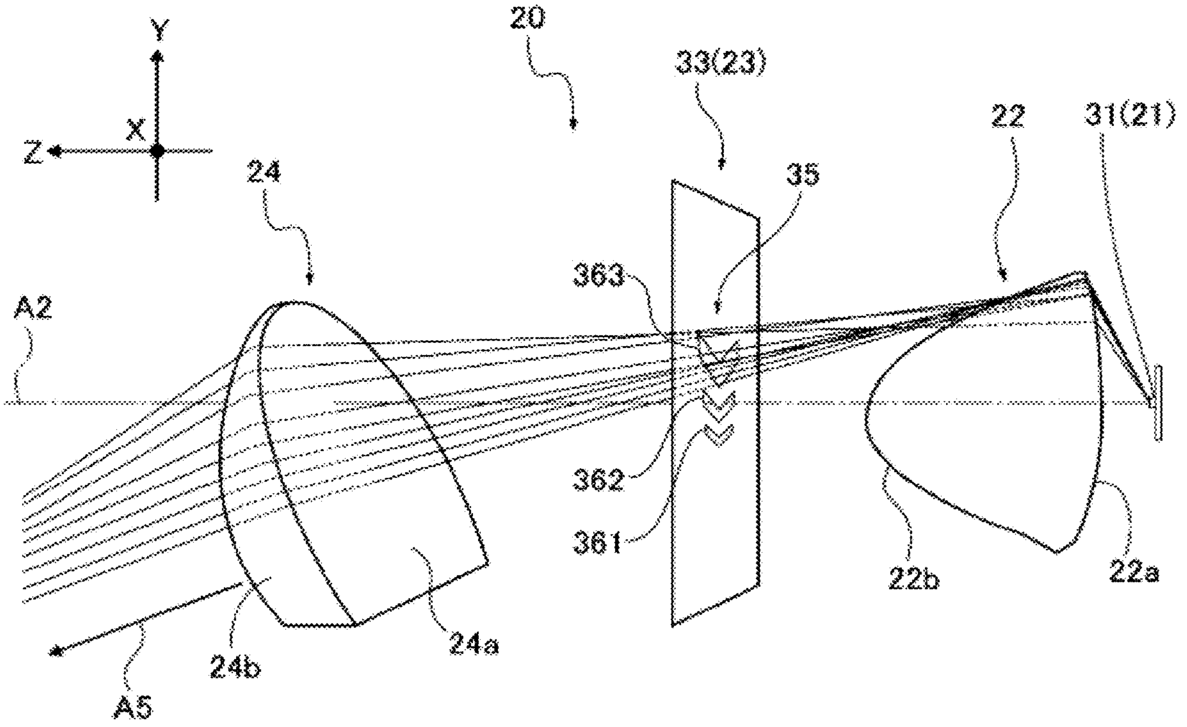
FIG. 8 is an explanatory diagram illustrating a state in which light from the light source travels through an upper third slit part on a longitudinal section (vertical section) of the lamp unit.

In detail, as illustrated in FIG. 8, the condenser lens 22 satisfies at least one of the requirement that the luminous flux toward the upper third slit part 363 among the light from the light source 31 is made parallel to the lamp unit axis A2, and the requirement that the luminous flux toward the upper third slit part 363 among the light from the light source 31 is tilted downward so as to approach the lamp unit axis A2 as the luminous flux goes toward the irradiation slit 35, and in Embodiment 1, both the requirements are mixed. Herein, in the condenser lens 22, the luminous flux that passes through the upper parts of the incident surface 22*a* and the light emission surface 22*b* mainly goes toward the third slit part 363. Therefore, in the condenser lens 22, the above light path is set mainly by setting the curvature of the upper parts of each of the incident surface 22*a* and the light emission surface 22*b*.

Figure 9:
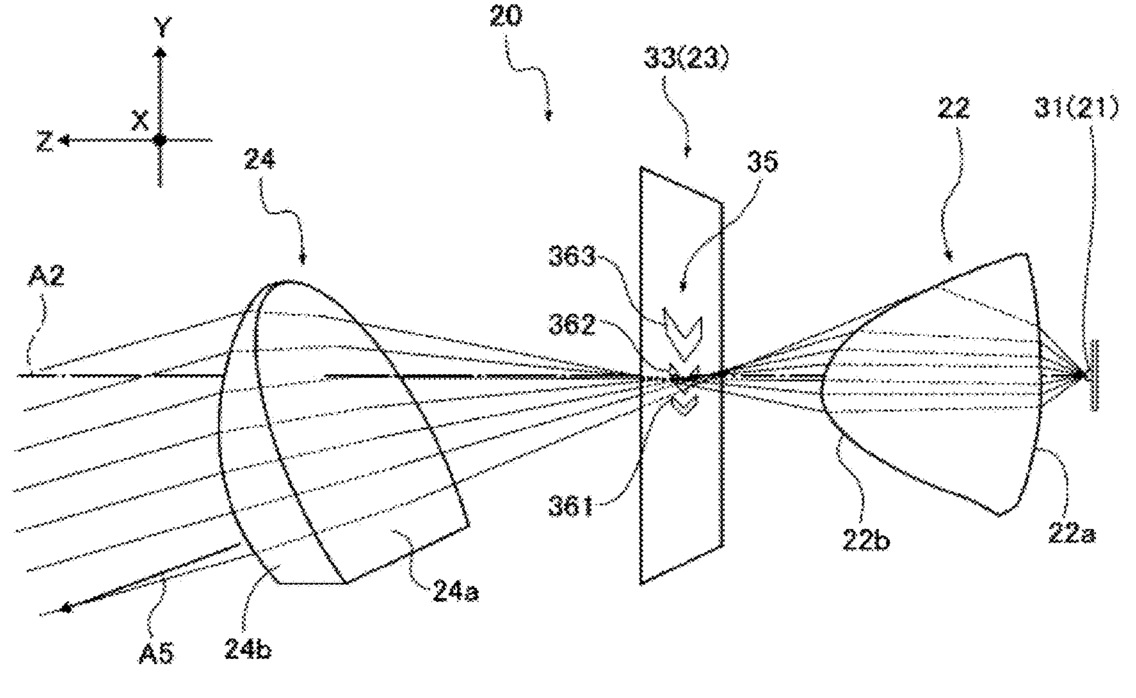
FIG. 9 is an explanatory diagram illustrating a state in which light from the light source travels through a middle second slit part on the longitudinal section (vertical section) of the lamp unit.

In addition, as illustrated in FIG. 9, the condenser lens 22 condenses the luminous flux toward the middle second slit part 362 among the light from the light source 31 in the vicinity of the second slit part 362, that is, intersects with the lamp unit axis A2 in the vicinity of the second slit part 362. Herein, in the condenser lens 22, the luminous flux that passes through the middle parts of the incident surface 22*a* and the light emission surface 22*b* mainly goes to the second slit part 362. Therefore, in the condenser lens 22, the above light path is set mainly by setting the curvature of the middle part of each of the incident surface 22*a* and the light emission surface 22*b*.

Figure 10:
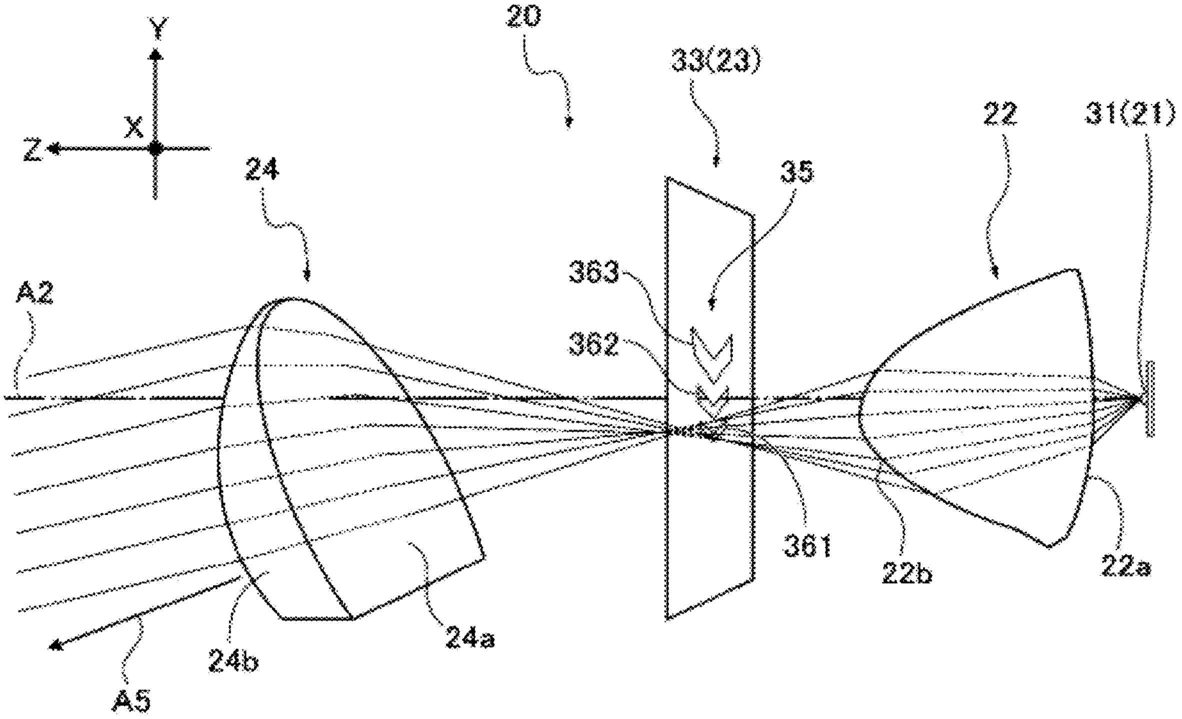
FIG. 10 is an explanatory diagram illustrating a state in which light from the light source travels through a lower first slit part on the longitudinal section (vertical section) of the lamp unit.
Figure 11:
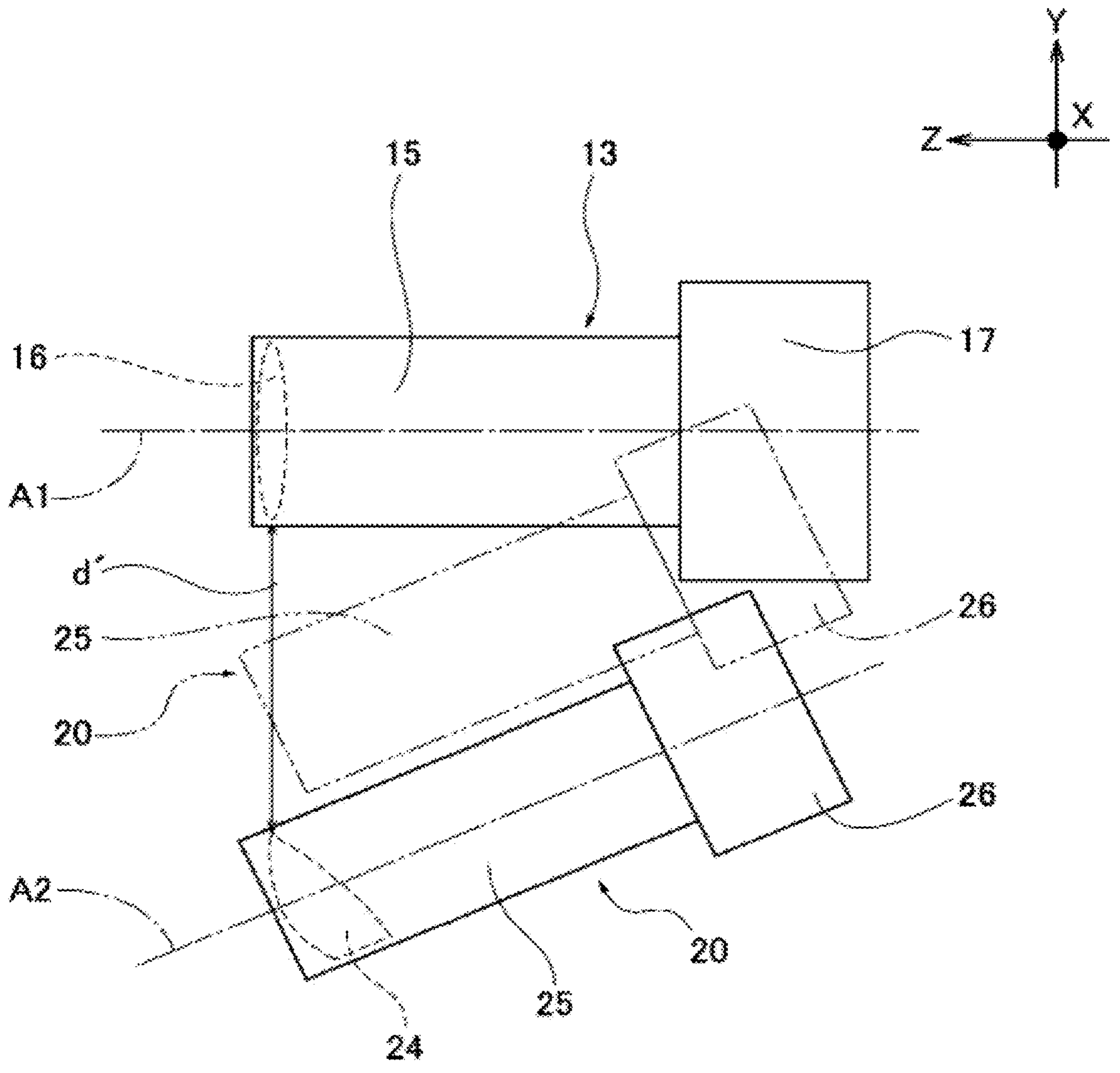
FIG. 11 is an explanatory diagram for illustrating a problem when tilting the lamp unit provided side by side with a signal lighting unit.

Furthermore, as illustrated in FIG. 10, the condenser lens 22 condenses the luminous flux toward the lower first slit part 361 among the light from the light source 31 in the vicinity of the first slit part 361, that is, causes mutual intersection in the vicinity of the first slit part 361. Herein, in the condenser lens 22, the luminous flux that passes through the lower parts of the incident surface 22*a* and the light emission surface 22*b* mainly goes toward the first slit part 361. Therefore, in the condenser lens 22, the above light path is set mainly by setting the curvature of the lower part of each of the incident surface 22*a* and the light emission surface 22*b*.

This condenser lens 22 has the above optical setting, so that the least amount of the light is collected in the third slit part 363, while the light from the light source 31 that passes through the condenser lens 22 is diffused evenly in the up and down directions in the setting area As, and the most amount of the light from the light source 31 is collected in the first slit part 361 as the light approaches downward. Herein, in FIG. 8 to FIG. 10, it seems that the luminous flux is collected in the same manner even for any of the slit parts 36. This is because the luminous flux is illustrated evenly in each figure to facilitate understanding of the state of the light path (luminous flux), and the actual respective amounts of luminous flux collected are reduced in order of the first slit part 361, the second slit part 362, and the third slit part 363. In addition, the slit parts 36 become smaller in size from the upper side to the lower side, and therefore the luminous flux is concentrated in a narrower range as the luminous flux goes downward. This also contributes to the fact that the most amount of the light is collected in the first slit part 361. Thus, the projection lens 24 projects the light that passes through the shade 23 having such a luminous flux distribution, that is, that is transmitted through each slit part 36, onto the road surface 2 on the projection lens axis A5.

This lamp unit 20 is assembled as follows. First, the light source 31 is mounted on the substrate 32, the light source part 21 is assembled, and the light source part 21 is fixed at the installation location 26*a* of the installation stand 26. After that, in the lower member 25*a* of the light source housing 25, the condenser lens 22 is fitted into the condenser lens groove, the shade 23 is fitted into the shade groove, and the projection lens 24 is fitted into the projection lens groove. Then, the lower member 25*a* is fitted to the upper member 25*b* to form the light source housing 25, and the light source housing 25 is attached to the installation stand 26 via both the mounting pieces 27. Then, the condenser lens 22, the shade 23, and the projection lens 24 are housed in the light source housing 25, and the light source part 21 is provided so as to face the condenser lens 22. Consequently, the condenser lens 22, the shade 23, and the projection lens 24 are arranged in order from the light source part 21 side on the lamp unit axis A2, and the lamp unit 20 is assembled with the projection lens 24 having such a posture that the projection lens axis A5 is tilted downward with respect to the lamp unit axis A2.

As illustrated in FIG. 2, this lamp unit 20 is located adjacent to the lower side of the signal lighting unit 13 in the lighting room 14, while the lamp unit axis A2 is parallel to the signal lighting unit axis A1 of the signal lighting unit 13, and the lamp unit 20 is fixed to the lamp housing 11. Consequently, the vehicle lighting tool 10 is assembled. In this vehicle lighting tool 10, the signal lighting unit axis A1 and the lamp unit axis A2 are parallel to the road surface 2, and the projection lens 24 having such a posture that the projection lens axis A5 is tilted downward with respect to the lamp unit axis A2 is provided in the lamp unit 20.

Now, the action of the vehicle lighting tool 10 will be described. In the vehicle lighting tool 10, the signal lighting unit 13 can be turned on and off as appropriate by supplying power from the lighting control circuit to the light source 31. Additionally, in the vehicle lighting tool 10, the lamp unit 20 can be turned on and off as appropriate by supplying power from the lighting control circuit from the substrate 32 to the light source 31. Then, the vehicle lighting tool 10 links the signal lighting unit 13 and the lamp unit 20, and when the signal lighting unit 13 is flashing, the light source 31 is turned in time with the flashing. Then, in the lamp unit 20, the light from the light source 31 is condensed by the condenser lens 22, the shade 23 is irradiated by the light, and the light passes through the irradiation slit 35 (each slit part 36), and is then projected by the projection lens 24, so that the irradiation pattern Pi is formed on the road surface 2. From this, in the lamp unit 20, the projection lens 24 (its light emission surface 24*b*) functions as a light-emitting part that emits light when viewed from the surroundings. In the irradiation pattern Pi, the light with the luminous flux distribution described above passes through the irradiation slit 35 (each slit part 36) of the shade 23, and is thereafter projected by the projection lens 24, so that the three irradiation designs Di are arranged in the arrow direction Da.

Therefore, the vehicle lighting tool 10 can cause a person around the vehicle 1 to see a state in which the signal lighting light-emitting part 16 of each signal lighting unit 13 is flashing, and a state in which the three irradiation designs Di arranged in each arrow direction Da are flashing on the road surface 2 nearby, so that it is possible to enhance the visibility of the turn lamps. This is especially effective because the irradiation pattern Pi on the road surface 2 can be seen even by a person who is at a position where it is difficult to see the signal lighting light-emitting parts 16 directly, such as a person who is in a different alley from the vehicle 1 at an intersection with poor visibility, or a person who attempts to overtake the vehicle 1 from behind. In addition, when the hazard lamps of the vehicle 1 are turned on, the two left and right vehicle lighting tools 10 are turned on at the same time, that is, the signal lighting light-emitting parts 16 of the left and right signal lighting units 13 are turned on, and both the irradiation patterns Pi are formed on the road surface 2 such that the both lamp units 20 spread to the left and right. Therefore, the vehicle 1 can cause a person to more reliably recognize that the hazard lamps are turned on compared to a case where only the signal lighting units 13 which serve as the left and right turn lamps are flashing.

Herein, the action of the lamp unit 20 will be described. The lamp unit 20 has such a posture that the projection lens axis A5 is tilted downward with respect to the lamp unit axis A2 by locating the reference focus Fb of the projection lens 24 on the lamp unit axis A2 and near the shade reference point Ps of the shade 23, and rotating the projection lens 24 about the reference focus Fb. Therefore, in the lamp unit 20, the projection lens 24 can project a state in which each slit part 36 is brightened by the light from the light source 31 in the shade 23 (shade part 33), onto the projection lens axis A5. At this time, the lamp unit 20 has the reference focus Fb located near the shade reference point Ps of the shade 23. Therefore, the projection lens 24 can project a state in which the vicinity of the shade reference point Ps, that is, each slit parts 36 is brightened with the least aberration according to the optical setting, onto the projection lens axis A5. Consequently, even when the lamp unit axis A2 is provided parallel to the road surface 2, the lamp unit 20 can appropriately form the irradiation pattern Pi on the road surface 2 from a higher position than the road surface 2.

In addition, in the lamp unit 20, the projection lens 24 is provided so as to have the projection lens axis A5 tilted downward with respect to the lamp unit axis A2 such that the lamp unit axis A2 is located within the incident range Ri from the reference focus Fb. Therefore, in the lamp unit 20, the direction along the lamp unit axis A2 of the light that passes through each slit part 36 is the brightest, but the projection lens 24 can efficiently condense such light according to the optical setting, and can appropriately project, on the projection lens axis A5, a state in which each slit part 36 is brightened.

Then, the lamp unit 20 satisfies at least one of the requirement that the luminous flux toward the upper third slit part 363 among the light from the light source 31 is made parallel to the lamp unit axis A2 in the condenser lens 22, and the requirement that the luminous flux is tilted downward so as to approach the lamp unit axis A2 as the luminous flux goes toward the irradiation slit 35. Herein, because of the positional relationship among light source 31, the shade 23, and the projection lens 24, it is not easy for the lamp unit 20 to efficiently project light through the third slit part 363 onto the projection lens axis A5 even when the projection lens 24 is tilted downward as described above. Therefore, in the lamp unit 20, the luminous flux from the condenser lens 22 toward the third slit part 363 is set as described above, and therefore even the light that passes through the third slit part 363 can be brought close to the direction in which the projection lens axis A5 of the projection lens 24 extends, compared to a case where such setting is not made. Therefore, even when the light passes through the third slit part 363, the lamp unit 20 can efficiently project the light onto the projection lens axis A5 by the projection lens 24. Consequently, the lamp unit 20 can more appropriately form the irradiation pattern Pi on the road surface 2 on the projection lens axis A5 by cooperation of the condenser lens 22 and the projection lens 24 tilted downward as described above.

In addition, in the lamp unit 20, the light source 31 has the two LED chips 31*a*, both the LED chips 31*a* are arranged in parallel in the width direction, and the phosphor material 31*b* is made long in the width direction. Herein, in the lamp unit 20, the condenser lens 22 irradiates the inside of the setting area A of the shade part 33 of the shade 23 with light while concentrating the light on the lamp unit axis A2 in the width direction, and condenses the light so as to concentrate the light in the setting area As in the up and down direction. In the lamp unit 20, the condenser lens 22 satisfies at least one of the requirement that the luminous flux toward the upper third slit part 363 among the light from the light source 31 is made parallel to the lamp unit axis A2, and the requirement that the luminous flux toward the upper third slit part 363 among the light from the light source 31 is tilted downward so as to approach the lamp unit axis A2 as the luminous flux goes toward the irradiation slit 35. Therefore, in the lamp unit 20, the control of the light from the light source 31 in the condenser lens 22 requires greater precision in the up and down direction than precision in the width direction. In the lamp unit 20, both the LED chips 31*a* are arranged in parallel in the width direction and the phosphor material 31*b* is made long in the width direction, so that the brightest portion of the light source 31 can be located at such a position as to overlap with the condenser lens axis A3 in the up and down direction. Therefore, in the lamp unit 20, the condenser lens 22 can control the light from the light source 31 with the least aberration according to the optical setting in the up and down direction, and therefore a more appropriate luminous flux distribution can be achieved for each slit part 36.

Herein, in the conventional vehicle lighting tool described in the prior art document forms the irradiation pattern on the road surface by tilting the lamp unit axis of the lamp unit, which is combination of the light source, the light-shielding member, and the projection lens, downward toward the road surface. Therefore, in the vehicle lighting tool, it is difficult to arrange the lamp unit and the signal lighting unit side by side to combine the lamp unit and the signal lighting unit into a single lighting tool. This will be described with reference to FIG. 2 and FIG. 11. Herein, a problem caused by tilting the lamp unit is similar even in the vehicle lighting tool 10 of Embodiment 1, in a case where the lamp unit 20 (lamp unit axis A2) is tilted with respect to the signal lighting unit 13 (signal lighting unit axis A1). Therefore, FIG. 11 uses the signal lighting unit 13 and the lamp unit 20 like FIG. 2.

First, in the vehicle lighting tool 10, in a case the two units (the signal lighting unit 13 and the lamp unit 20) are provided to be combined into a single lighting tool, a distance between the light-emitting parts of the both units, that is, the signal lighting light-emitting part 16 and the projection lens 24 (its light emission surface 24*b*) is stipulated by regulations so as to be less than or equal to a predetermined interval d (see FIG. 2). This predetermined interval d is 75 mm. Herein, the signal lighting unit 13 is a device that directly shows the signal lighting light-emitting part 16, that is, the light emitted from the signal lighting light-emitting part 16 to a person around the device, and therefore the signal lighting unit axis A1 and the road surface 2 are provided in parallel. Therefore, in the vehicle lighting tool 10, when the lamp unit 20 is tilted downward as illustrated by the broken line in FIG. 11, the tilted lamp unit 20 interferes with the signal lighting unit 13. In the vehicle lighting tool 10, as illustrated by the solid line in FIG. 11, when the tilted lamp unit 20 is lowered to such a position as not to interfere with the signal lighting unit 13, an interval d' between the signal lighting light-emitting part 16 and the projection lens 24 (light emission surface 24*b*) becomes larger than the predetermined interval d. Therefore, in the conventional vehicle lighting tool, since the lamp unit is tilted, even when the lamp unit and the signal lighting unit try to be arranged side by side and combined into a single lighting tool, the regulations cannot be met.

On the other hand, in the vehicle lighting tool 10, the lamp unit 20 tilts the projection lens 24 (projection lens axis A5) downward about the reference focus Fb, so that even when the lamp unit axis A2 is parallel to the road surface 2, the irradiation pattern Pi can be formed on the road surface 2. Therefore, in the vehicle lighting tool 10, the lamp unit 20 and the signal lighting unit 13 can be provided side by side in a state in which the lamp unit axis A2 and the signal lighting unit axis A1 are parallel, as illustrated in FIG. 2. Therefore, the signal lighting light-emitting part 16 and the projection lens 24 (light emission surface 24*b*) can be kept within the predetermined interval d (within the regulations). Consequently, in the vehicle lighting tool 10, the lamp unit 20 and the signal lighting unit 13 are arranged side by side and combined into a single lighting tool, the degree of freedom in the position and the manner of mounting on the vehicle 1 can be enhanced, and usability can be improved.

The lamp unit 20 and the vehicle lighting tool 10 of Embodiment 1 can obtain the following effects.

In the lamp unit 20, the light source 31, the condenser lens 22, the light-shielding member (shade 23), and the projection lens 24 are arranged along the lamp unit axis A2. In the lamp unit 20, the projection lens 24 has the reference focus Fb set on the lamp unit axis A2, and is disposed at such a position rotated downward about the reference focus Fb, and the projection lens axis A5 is directed further downward than the lamp unit axis A2. Therefore, even when the lamp unit axis A2 is provided parallel to the road surface 2, the lamp unit 20 can project the light that passes through the irradiation slit 35 of the light-shielding member (shade 23) in the direction of the projection lens axis A5, and can form the irradiation pattern Pi on the road surface 2.

In the lamp unit 20, the projection lens 24 is tilted downward such that the lamp unit axis A2 is located within the incident range Ri of the light set around the projection lens axis A5. Therefore, in the lamp unit 20, of the light that passes through each slit part 36, the light in the direction along the lamp unit axis A2 is the brightest, but the projection lens 24 can efficiently condenses such light according to the optical setting, and the state in which the irradiation slit 35 is brightened can be appropriately projected onto the projection lens axis A5 by the passing light.

In the lamp unit 20, the condenser lens 22 satisfies at least one of the requirement that the traveling direction of the light emitted from the light source 31 to pass through an upper end of the irradiation slit 35 is made parallel to the lamp unit axis A2, and the requirement that the traveling direction is tilted downward so as to approach the lamp unit axis A2 as the traveling direction of the light goes toward the irradiation slit 35. Therefore, the lamp unit 20 can bring even the light that passes through the upper end of the irradiation slit 35 close to the direction in which the projection lens axis A5 of the projection lens 24 extends, and can more appropriately form the irradiation pattern Pi on the road surface 2 on the projection lens axis A5 by cooperation of the projection lens 24 tilted downward.

In the lamp unit 20, the light source 31 is disposed at such a position that the light emitting surface (phosphor material 31*b*) overlaps with the condenser lens axis A3 of the condenser lens 22 in the up and down direction (vertical direction). Therefore, in the lamp unit 20, the condenser lens 22 can efficiently cause the light from the light source 31 to travel in the direction according to the optical setting, and it is possible to easily control the direction of the luminous flux directed there while ensuring brightness on the light-shielding member (shade 23).

In the lamp unit 20, the light-shielding member (shade 23) sets the shade reference point Ps on the lamp unit axis A2, and the projection lens 24 is disposed such that the reference focus Fb is located near the shade reference point Ps. Therefore, in the lamp unit 20, the projection lens 24 can project the light-shielding member with the least aberration according to the optical setting, and can more appropriately project, on the projection lens axis A5, the state in which the irradiation slit 35 is brightened by the light that passes therethrough.

The vehicle lighting tool 10 includes the lamp unit 20 described above. Therefore, the vehicle lighting tool 10 can form the irradiation pattern Pi on the road surface 2 even when the lamp unit 20 is provided such that the lamp unit axis A2 is parallel to the road surface 2, and therefore the degree of freedom in the position and the manner of mounting on the vehicle 1 can be enhanced, and usability can be improved.

The vehicle lighting tool 10 further includes the signal lighting unit 13 with the signal lighting light-emitting part 16 set on the signal lighting unit axis A1, and the lamp unit 20 and the signal lighting unit 13 are located adjacent to each other with the lamp unit axis A2 and the signal lighting unit axis A1 parallel to each other. Therefore, the vehicle lighting tool 10 can bring the signal lighting light-emitting part 16 and the projection lens 24 (light emission surface 24*b*) close to each other at less than the predetermined interval d (interval specified by regulations), and the vehicle lighting tool 10 can form the irradiation pattern Pi on the road surface 2 while arranging the lamp unit 20 and the signal lighting unit 13 side by side and combining the lamp unit 20 and the signal lighting unit 13 into a single lighting tool.

Therefore, the lamp unit 20 (vehicle lighting tool 10) of Embodiment 1, which is a lamp unit (vehicle lighting tool) according to the present disclosure, can form the irradiation pattern Pi on the road surface 2 without almost tilting the inclination of the lamp unit axis A2 with respect to the road surface 2.

Embodiment 2

Now, a lamp unit 20A and a vehicle lighting tool 10A of Embodiment 2 as examples of a lamp unit and a vehicle lighting tool according to the present disclosure will be described with reference to FIG. 12 to FIG. 14. The vehicle lighting tool 10A (lamp unit 20A) has the same basic concept and configuration as the vehicle lighting tool 10 (lamp unit 20) of Embodiment 1, and therefore parts with the same configuration are denoted by the same reference numerals, and the details thereof are not described.

In the vehicle lighting tool 10A of Embodiment 2, the lamp unit 20A has a light source part 21A and a condenser lens 22A which are different in configuration from those of the lamp unit 20 of Embodiment 1, and a posture of a shade 23 is different. In this lamp unit 20A, as illustrated in FIG. 13, the light source part 21A has a first light source 311 and a second light source 312, which are mounted on a substrate 32. The first light source 311 and the second light source 312 have the same configurations as the light source 31 of Embodiment 1, and each phosphor material 31*b* functions as a light emitting surface. In the first light source 311 and the second light source 312, the phosphor materials 31*b* each have a long rectangular shape in the width direction, and each emission optical axis 31L is set by extending from the center in the axial direction.

The first light source 311 and the second light source 312 are each provided on the substrate 32 at a position above the lamp unit axis A2 in the up and down direction, and are provided side by side in parallel in the width direction with an interval. In the first light source 311 and the second light source 312, each phosphor material 31*b* is located above a straight line that includes the lamp unit axis A2 and extends in the width direction, and is located so as to overlap with a straight line that includes the condenser lens axis A3 of the condenser lens 22A in the up and down direction with and extends in the width direction. Therefore, the first light source 311 and the second light source 312 are arranged at such positions that the phosphor materials 31*b*, which serve as light emitting surfaces, overlap with the condenser lens axis A3 of the condenser lens 22A in the up and down direction (vertical direction).

Figure 12:
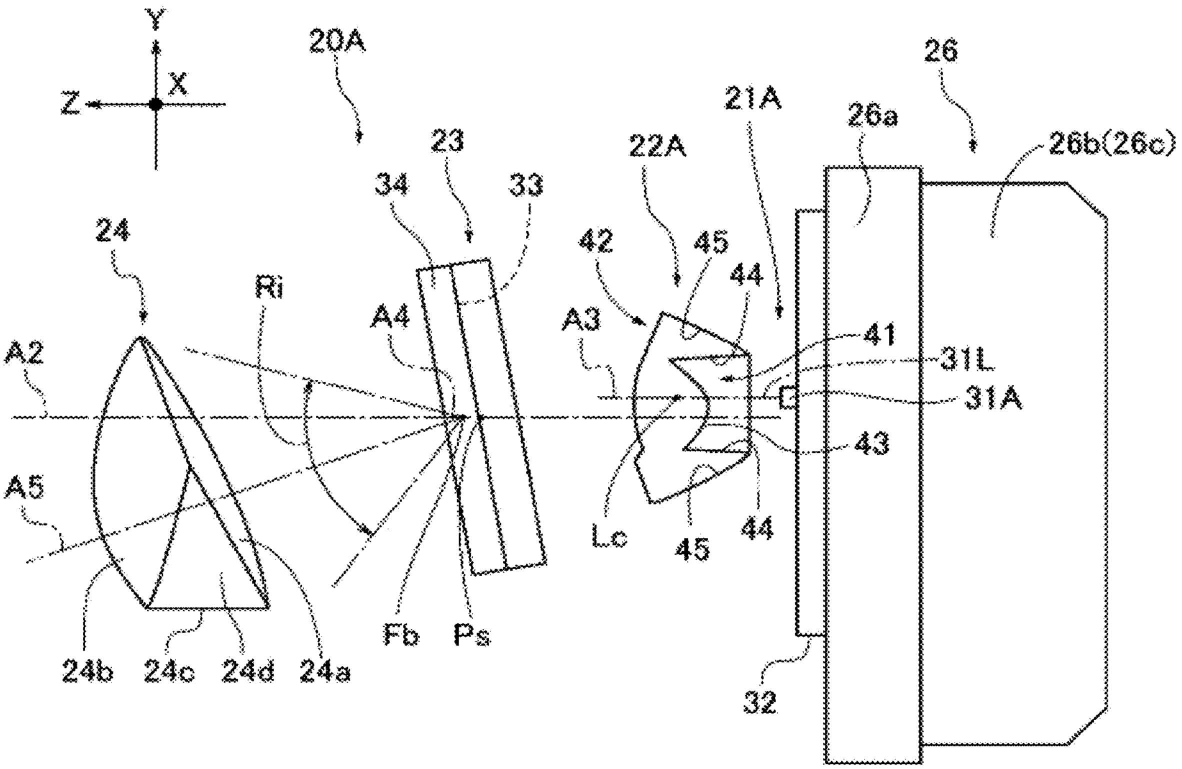
FIG. 12 is an explanatory diagram similar to FIG. 4, illustrating a configuration of a lamp unit of Embodiment 2.
Figure 13:
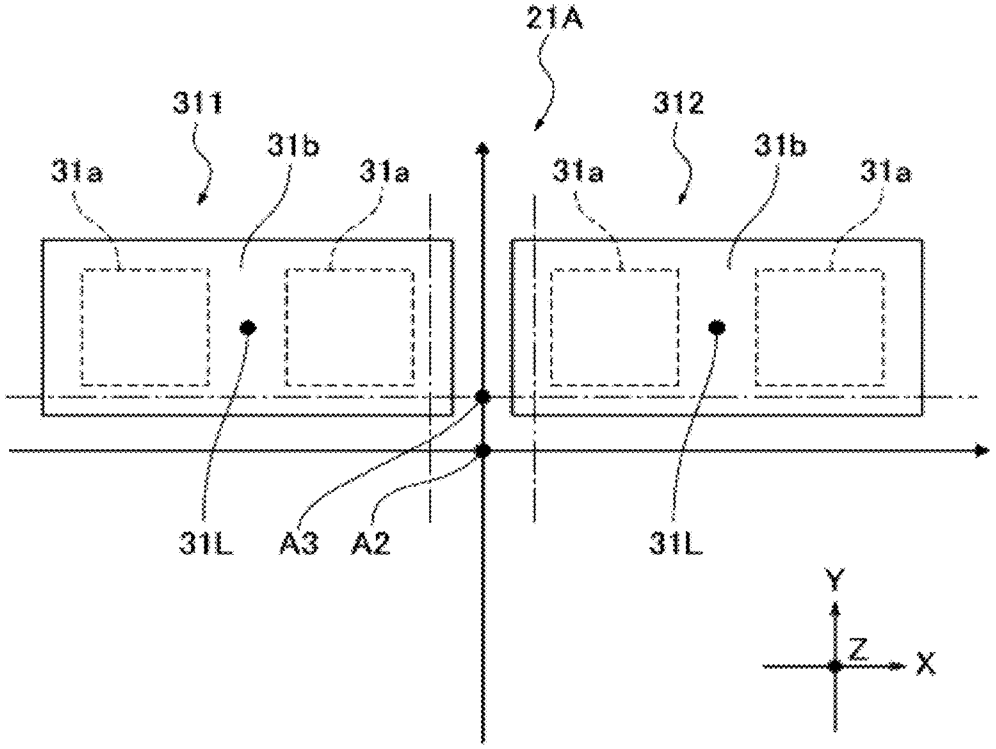
FIG. 13 is an explanatory diagram similar to FIG. 5 illustrating a configuration and positional relationship of a light source of Embodiment 2.

This condenser lens 22A has an incident surface 41 facing the light source part 21A and a light emission surface 42 facing the opposite side, as illustrated in FIG. 12. The incident surface 41 has a central part recessed to the inside of the condenser lens 22A (on the opposite side from the light source part 21A), and a curved incident surface part 43 that is convexly curved outward at the center, and an annular incident surface part 44 surrounding the curved incident surface part 43. Additionally, a truncated conical reflective surface 45 surrounding the annular incident surface part 44 is provided around the incident surface 41.

The curved incident surface part 43 faces the light source part 21A in the axial direction, and the light source part 21A is located near a focus on the rear side (rear focus). The curved incident surface part 43 allows light emitted from the light source part 21A to enter the condenser lens 22A as light that travels forward in the axial direction. The annular incident surface part 44 protrudes toward the light source part 21A side and allows light from the light source part 21A, which does not travel to the curved incident surface part 43, to enter the condenser lens 22A. The reflective surface 45 is formed at such a position that light which enters the condenser lens 22A from the annular incident surface part 44 travels. When the reflective surface 45 reflects the light incident from the annular incident surface part 44, the light travels forward in the axial direction. The reflective surface 45 may reflect light using total reflection, or may reflect light by adhering aluminum, silver, or the like by vapor deposition or painting. Therefore, in the condenser lens 22A, on the incident surface 41, the light that passes through the curved incident surface part 43 becomes direct light that goes directly to the light emission surface 42, and the light that passes through the annular incident surface part 44 and is reflected by the reflective surface 45 is reflected internally and then becomes reflected light that goes toward the light emission surface 42.

In this condenser lens 22A, the central axis line of the annular incident surface part 44 of the incident surface 41 is defined as the condenser lens axis A3. As illustrated in FIG. 12 and FIG. 13, in the condenser lens 22A, the condenser lens axis A3 is disposed at such a position as to be displaced above the lamp unit axis A2 in the up and down direction. In the condenser lens 22A, in the up and down direction (vertical direction), the condenser lens axis A3 is located at such a position as to overlap with the respective light emitting surfaces (phosphor materials 31*b*) of the first light source 311 and the second light source 312 below the respective emission optical axes 31L. Therefore, in the condenser lens 22A has such positional relationship that while the first light source 311 and the second light source 312 are basically located inside the annular incident surface part 44, and face the curved incident surface part 43 in the axial direction, the first light source 311 and the second light source 312 are displaced slightly above the condenser lens axis A3.

The light emission surface 42 emits the light incident from the incident surface 41 to the front side in the axial direction. The light emission surface 42 condenses the light incident from the incident surface 41 onto a setting area As, and allows the light to travel toward the irradiation slit 35 (each slit part 36). In the condenser lens 22A, the aspect of the luminous flux leading to the shade 23 is set according to the position of the irradiation slit 35 (each slit part 36). This setting is basically the same as the setting of the condenser lens 22 of Embodiment 1, and satisfies at least one of a requirement that at least a light path (luminous flux) toward an upper part of the irradiation slit 35 is made parallel to the lamp unit axis A2, and a requirement that the light path (luminous flux) toward the upper part of the irradiation slit 35 is tilted downward so as to approach the lamp unit axis A2 as the light path (luminous flux) goes toward the irradiation slit 35.

Figure 14:
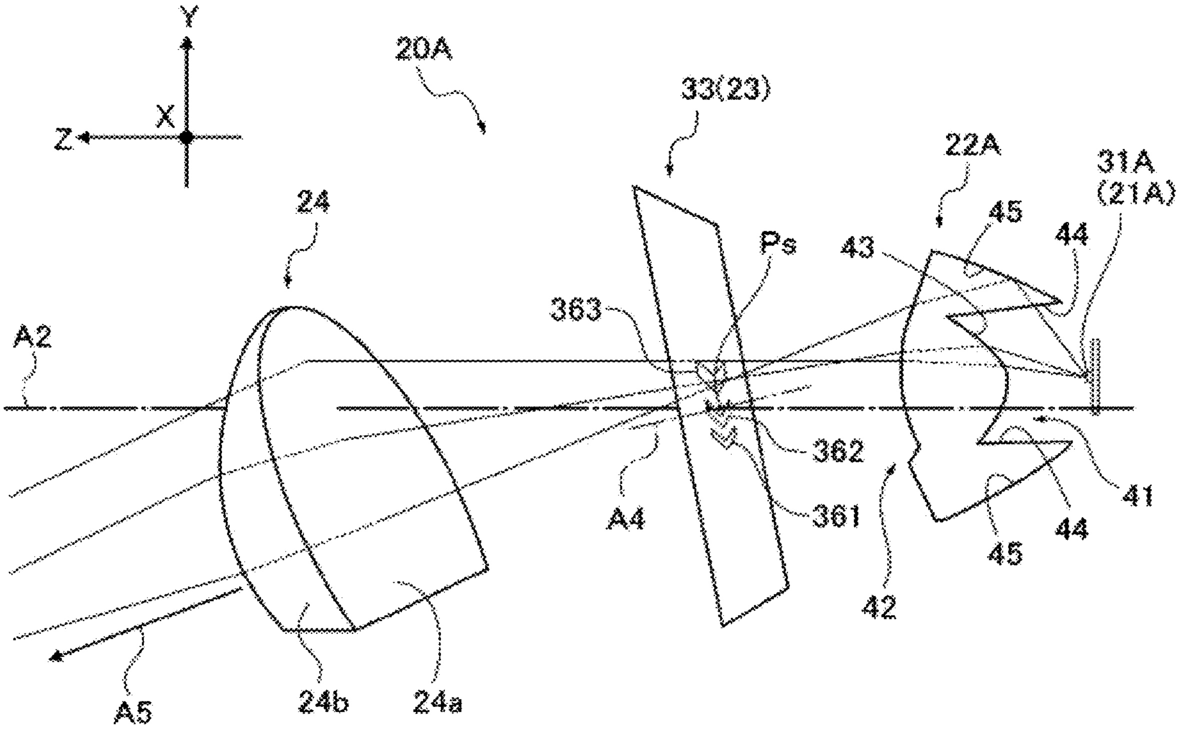
FIG. 14 is an explanatory diagram illustrating a state in which light from the light source 31 travels through an upper third slit part on a longitudinal section (vertical section) of the lamp unit of Embodiment 2.

In detail, as illustrated in FIG. 14, the condenser lens 22A satisfies at least one of the requirement that the luminous flux toward an upper third slit part 363 among the light from the light source part 21A (light sources 311 and 312) is made parallel to the lamp unit axis A2, and the requirement that the luminous flux toward the upper third slit part 363 among the light from the light source 31 is tilted downward so as to approach the lamp unit axis A2 as the luminous flux goes toward the irradiation slit 35, and in Embodiment 1, both the requirements are mixed. In addition, the condenser lens 22A condenses the luminous flux toward a middle second slit part 362 among the light from light source part 21A (light sources 311 and 312) in the vicinity of the second slit part 362, and condenses the luminous flux toward a lower first slit part 361 in the vicinity of the first slit part 361. These light paths are set by adjusting the curvature of the incident surface 41 (mainly, the curved incident surface part 43 and the reflective surface 45), and the curvature of the light emission surface 42 while considering the positional relationship of the condenser lens 22A with respect to the light source part 21A (light sources 311 and 312) mentioned above.

The shade 23 has the same configuration as the shade 23 of Embodiment 1, but a posture with respect to the lamp unit axis A2 is different from that in Embodiment 1. The shade 23 of Embodiment 2 is rotated so as to displace the front side (projection lens 24 side) in the axial direction of the shade reference axis line A4 downward about a line, which passes through a shade reference point Ps and extends in the width direction, and the shade reference axis line A4 is tilted with respect to the lamp unit axis A2. The inclination (angle) of the shade reference axis line A4 with respect to the lamp unit axis A2 is smaller than the inclination of the projection lens axis A5 of the projection lens 24 with respect to the lamp unit axis A2. The inclination of the shade reference axis line A4 with respect to the lamp unit axis A2 is not preferably more than half the inclination of the projection lens axis A5 with respect to the lamp unit axis A2, and in Embodiment 2, the inclination of the shade reference axis line A4 is substantially 10 degrees.

This vehicle lighting tool 10A is configured as described above, so that the vehicle lighting tool 10A can form an irradiation pattern Pi on a road surface 2 in the same manner as the vehicle lighting tool 10 of Embodiment 1. At this time, in the vehicle lighting tool 10A, in the lamp unit 20A, the single condenser lens 22A that guides light from each of the two light sources (311, 312) inward from the incident surface 41 and emits each light from the light emission surface 42 is provided for the two light sources (311, 312). In the lamp unit 20A, the light emitted from each of both the light sources in the direction substantially along each emission optical axis 31L enters from the curved incident surface part 43 of the incident surface 41 in the condenser lens 22A, and the light emitted from each of both the light sources in such a direction that each light spreads (large angle with respect to the emission optical axis 31L) enters from the annular incident surface part 44 of the incident surface 41 and is reflected by the reflective surface 45. Therefore, the lamp unit 20A can efficiently utilize the light emitted from each light source 31 even when a single condenser lens 22A is used for the two light sources (311, 312).

In addition, the lamp unit 20A has the light source part 21A and the condenser lens 22A displaced above the lamp unit axis A2, that is, the shade reference axis line A4 of the shade 23, and the traveling direction of light that emits from the light source part 21A and goes from the condenser lens 22A to the setting area As of the shade 23 is directed downward. Therefore, in the lamp unit 20A, optical setting in the condenser lens 22A (at least one of the requirement that the light path (luminous flux) toward the upper part of the irradiation slit 35 is made parallel to the lamp unit axis A2, and the requirement that the light path (luminous flux) toward the upper part of the irradiation slit 35 is tilted downward so as to approach the lamp unit axis A2 as the light path (luminous flux) goes toward the irradiation slit 35 is satisfied) can be assisted by the positional relationship of the light source part 21A and the condenser lens 22A with respect to the shade 23. Consequently, in the lamp unit 20A, it is possible to reduce the amount of adjustment of the curvature of each of the incident surface 41 and the light emission surface 42 for the optical setting in the condenser lens 22A, and the light path from the condenser lens 22A to the shade 23 can be appropriately set with a simpler configuration. Therefore, the lamp unit 20A can appropriately form the irradiation pattern Pi on the road surface 2 even when the lamp unit axis A2 is parallel to the road surface 2.

Furthermore, in the lamp unit 20A, the condenser lens 22A and both the light sources are provided such that the emission optical axes 31L of both the light sources (311, 312) of the light source part 21A are located above the condenser lens axis A3 of the condenser lens 22A. Therefore, in the lamp unit 20A, the traveling direction of the light from the light source part 21A toward the condenser lens 22A can be directed downward. Consequently, in the lamp unit 20A, optical setting in the condenser lens 22A (at least one of the requirement that the light path (luminous flux) toward the upper part of the irradiation slit 35 is made parallel to the lamp unit axis A2, and the requirement that the light path (luminous flux) toward the upper part of the irradiation slit 35 is tilted downward so as to approach the lamp unit axis A2 as the light path (luminous flux) goes toward the irradiation slit 35) can be assisted by the positional relationship of the light source part 21A with respect to the condenser lens 22A. Consequently, in the lamp unit 20A, it is possible to reduce the amount of adjustment of the curvature of each of the incident surface 41 and the light emission surface 42 for the optical setting in the condenser lens 22A, and the light path from the condenser lens 22A to the shade 23 can be appropriately set with a simpler configuration.

The vehicle lighting tool 10A and the lamp unit 20A of Embodiment 2 can obtain the following effects. The vehicle lighting tool 10A and the lamp unit 20A basically have the same configuration as the vehicle lighting tool 10 and the lamp unit 20 of Embodiment 1, and therefore can obtain the same effects as Embodiment 1.

In addition, in the lamp unit 20A, a light-shielding member (shade 23) is rotated so as to displace the projection lens 24 side of the light-shielding reference axis line (shade reference axis line A4) downward about the reference point (shade reference point Ps). Therefore, the lamp unit 20A can make the luminous flux, which has an inclination close to the projection lens axis A5 of the projection lens 24, more easily go from the light-shielding member (shade 23) to the projection lens 24, and can assist projection onto the projection lens axis A5 by the projection lens 24. In particular, in the lamp unit 20A, the inclination of the light-shielding reference axis line (shade reference axis line A4) with respect to the lamp unit axis A2 is smaller than the inclination of the projection lens axis A5 with respect to the lamp unit axis A2. Therefore, in the lamp unit 20A, the downward angle can be gradually increased using the light-shielding member (shade 23) and the projection lens 24, and therefore the direction in which the luminous flux travels more smoothly can be tilted downward.

Accordingly, the lamp unit 20A (vehicle lighting tool 10A) of Embodiment 2, which is a lamp unit (vehicle lighting tool) according to the present disclosure, can form the irradiation pattern Pi on the road surface 2 without tilting the lamp unit axis A2 with respect to the road surface 2.

Although the vehicle lighting tool and the lamp unit of the present disclosure are described on the basis of each embodiment, the specific configuration is not limited to each embodiment, and changes and additions to the design are permissible as long as the changes and the additions do not depart from the gist of the invention according to each claim in the scope of claims.

In addition, in each embodiment, the three irradiation designs Di, which are V-shaped symbols, are arranged at substantially equal intervals in the direction away from the vehicle 1 to form the irradiation pattern Pi. However, when the irradiation pattern is formed by the shade (light-shielding member), the design of the symbol as the irradiation design Di, the position where the irradiation design is formed, the number of the irradiation designs Di, and the like can be set as appropriate, and are not limited to each embodiment. Each of the slit parts 36 of the shade 23 may each have a design, a position where a design is formed, the number, and the like formed according to the set irradiation pattern as appropriate, and is not limited to the configuration of each embodiment. In addition, the vehicle lighting tools 10 and 10A (lamp units 20 and 20A) are provided at the front parts of the vehicle 1 in the respective embodiments. However, as long as the vehicle lighting tools are provided in the vehicle 1 depending on the positions where irradiation patterns are formed with respect to the vehicle 1, the vehicle lighting tools 10 and 10A (lamp units 20 and 20A) may be disposed in headlight lighting rooms or taillight lighting rooms (lighting rooms on both left and right sides of the rear of the vehicle), and are not limited to the configuration of each embodiment.

Furthermore, in each embodiment, the light sources (31, 311, 312) each emit amber-colored light. However, the color of the light emitted from the light source 31 may be appropriately set according to the location where the light source 31 is provided and the content to be conveyed, and is not limited to the configuration of each embodiment.

Furthermore, in each embodiment, the shade 23 which passes the light condensed by the condenser lens 22 or 22A through irradiation slit 35 is used as a light-shielding member. However, the light-shielding member may have any other configuration as long as the light-shielding member is provided with the irradiation slit 35 that partially passes the light condensed by the condenser lens 22, and is not limited to the configuration of each embodiment. Other configurations may include, for example, a light shielding plate (filter) formed by providing an irradiation slit, which partially transmits light, on a plate-like film member, which blocks light transmission, and transmitting light which passes through the condenser lens 22 or 22A from the irradiation slit.

In each embodiment, the vehicle lighting tools 10 or 10A (lamp unit 20 or 20A) are provided in the vehicle 1 driven by a driver. However, the vehicle lighting tools (lamp units) may be provided in a vehicle having an automatic driving function, and are not limited to the configuration of each embodiment. In this case, the vehicle lighting tools (lamp units) may form irradiation patterns at timing that corresponds to intended use for providing, that is, timing in accordance with some intention regarding operation of the vehicle 1, and are not limited to the configuration of each embodiment.

In each embodiment, in the lamp unit 20 or 20A, the light source part 21 or 21A is provided on the installation stand 26 which functions as a heat sink, and this installation stand 26 is configured to be connected to the light source housing 25. However, as long as the lamp unit is one that forms an irradiation pattern by condensing light from a light source onto a light-shielding member using a condenser lens and projecting the light that passes through the light-shielding member using a projection lens, the light source part may be provided at the end of the housing, or may have other configurations, and is not limited to the configuration of each embodiment.

In each embodiment, the single light source 31 or the two light sources 311 and 312 are provided. However, the number and the arrangement of the light sources may be set as appropriate, and are not limited to the configuration of each embodiment. Herein, when a plurality of the light sources are provided, the light sources are desirably arranged in parallel in the width direction in order that the condenser lens 22 or 22A can control light from each light source 31 with the least aberration according to the optical setting in the up and down direction.

In each embodiment, the lamp unit axis A2 of the lamp unit 20 or 20A and the signal lighting unit axis A1 of the signal lighting unit 13 are parallel. However, the lamp unit axis A2 and the signal lighting unit axis A1 do not need to be completely parallel as long as the lamp unit axis A2 and the signal lighting unit axis A1 are substantially parallel. Herein, the "substantially parallel" means that the angle to be formed is no more than 3 degrees, preferably within 1 degree. Therefore, the lamp unit axis A2 may also be substantially parallel to the road surface 2, that is, may be tilted at an upper limit of 3 degrees.

In each embodiment, the condenser lens 22 or 22A is parallel to the condenser lens axis A3 and the lamp unit axis A2. However, the condenser lens 22 or 22A may be rotated so as to displace the light-shielding member (shade 23) side of the condenser lens axis A3 downward about the lens center point Lc, and is not limited to the configuration of each embodiment. At this time, the inclination of the condenser lens axis A3 with respect to the lamp unit axis A2 is desirably smaller than the inclination of the light-shielding reference axis line (shade reference axis line A4) with respect to the lamp unit axis A2, and is preferably not more than half the inclination of the light-shielding reference axis line with respect to the lamp unit axis A2. Thus, it is possible to assist in setting the light path from condenser lens 22 or 22A to the shade 23 as described above, and it is possible to reduce the amount of adjustment of the curvature of each of the incident surface 41 and the light emission surface 42 for the optical setting in the condenser lens 22 or 22A.

In Embodiment 1, the shade reference axis line A4 of the shade 23 is parallel to the lamp unit axis A2, and in Embodiment 2, the shade reference axis line A4 of the shade 23 is titled so as to displace the projection lens 24 side downward with respect to the lamp unit axis A2. However, in the configuration of Embodiment 1, the shade 23 may be tilted as in Embodiment 2, and in the configuration of Embodiment 2, the shade 23 may be not tilted as in Embodiment 1, and the configuration of the shade is not limited to the configuration of each embodiment.

In each embodiment, in the vehicle lighting tool 10 (10A), a part of the signal lighting radiation part 17 of the signal lighting unit 13, a part of the installation stand 26 of the lamp unit 20 (20A) are exposed to the outside of the lamp housing 11. However, the vehicle lighting tool may include the entire signal lighting unit 13 and the entire lamp unit 20 (20A) inside the lamp housing 11, and is not limited to the configuration of each embodiment. In this case, the signal lighting unit 13 and the lamp unit 20 (20A) are fixed to the lamp housing 11 via a bracket or the like, so that the signal lighting unit axis A1 and the lamp unit axis A2 can be provided in parallel (substantially parallel).

In each embodiment, the lamp unit 20 (20A) is disposed adjacent to the signal lighting unit 13 in the vehicle lighting tool 10 (10A). However, the vehicle lighting tool only needs to include the lamp unit 20 (20A) having the configuration described above, and is not limited to the configuration of each embodiment. This vehicle lighting tool can be provided with the lamp unit 20 (20A) with the lamp unit axis A2 parallel (substantially parallel) to the road surface 2, and therefore the degree of freedom in the position and the manner of mounting on the vehicle 1 can be enhanced, and usability can be improved. Even in this case, the vehicle lighting tool provided with the signal lighting unit can be provided with the signal lighting unit axis and the lamp unit axis A2 made parallel (substantially parallel).

DESCRIPTION OF REFERENCE NUMERALS

10, 10A vehicle lighting tool
13 signal lighting unit
16 signal lighting light-emitting part
20, 20A lamp unit
22, 22A condenser lens
23 shade (as an example of light-shielding member)
24 projection lens
31, 311, 312 light source
31*b* phosphor material (as an example of light emitting surface)
35 irradiation slit
A1 signal lighting unit axis
A2 lamp unit axis
A3 condenser lens axis
A4 shade reference axis line (as an example of light-shielding reference axis line)
A5 projection lens axis
Fb reference focus
Lc lens center point
Pi irradiation pattern
Ps shade reference point (as an example of reference point)
Ri incident range

The invention claimed is:

1. A lamp unit lamp comprising:

a light source;

a condenser lens that condenses light from the light source;

a light-shielding member provided with an irradiation slit through which the light condensed by the condensing lens partially passes; and a projection lens that projects the light which passes through the light-shielding member to form an irradiation pattern, the light source, the condenser lens, the light-shielding member, and the projection lens being arranged along a lamp unit axis, wherein the light-shielding member is arranged such that a reference point of the light-shielding member is set at a center position of the light-shielding member so that the light-shielding member is disposed with the reference point being located on the lamp unit axis, and the projection lens has a reference focus and is arranged such that the reference focus of the projection lens is located on the lamp unit axis and near the reference point of the light-shielding member and the projection lens is disposed at such a position rotated downward about the reference focus so that a projection lens axis is directed further downward than the lamp unit axis.

2. The lamp unit according to claim 1, wherein the projection lens is tilted downward such that the lamp unit axis is located within an incident range of light set about the projection lens axis.

3. The lamp unit according to claim 1, wherein the condenser lens satisfies at least one of a requirement that a traveling direction of light emitted from the light source to pass through an upper end of the irradiation slit is made parallel to the lamp unit axis, and a requirement that the traveling direction is tilted further downward than the lamp unit axis.

4. The lamp unit according to claim 1, wherein the light source has a light emitting surface, and is disposed at such a position that the light emitting surface overlaps with a condenser lens axis of the condenser lens in a vertical direction.

5. The lamp unit according to claim 1, wherein the light-shielding member has a light-shielding reference axis line passing through the reference point and orthogonal to a surface provided with the irradiation slit, and is disposed such that a side close to the projection lens of the light-shielding reference axis line is rotated about the reference point so as to be displaced downward, an inclination of the light-shielding reference axis line with respect to the lamp unit axis is smaller than an inclination of the projection lens axis with respect to the lamp unit axis.

6. The lamp unit according to claim 5, wherein the condenser lens is rotated so as to displace a side close to the light-shielding member of the condenser lens axis downward about a lens center point, and an inclination of the condenser lens axis with respect to the lamp unit axis is smaller than an inclination of the light-shielding reference axis line with respect to the lamp unit axis.

7. A vehicle lighting tool comprising the lamp unit according to claim 1.

8. The vehicle lighting tool according to claim 7, further comprising a signal lighting unit having a signal lighting light-emitting part set on a signal lighting unit axis, wherein the lamp unit and the signal lighting unit have the lamp unit axis and the signal lighting unit axis, respectively, which are parallel and adjacent to each other.

9. A lamp unit comprising:

a light source;

a condenser lens that condenses light from the light source;

a light-shielding member provided with an irradiation slit through which the light condensed by the condensing lens partially passes; and a projection lens that projects the light which passes through the light-shielding member to form an irradiation pattern, the light source, the condenser lens, the light-shielding member, and the projection lens being arranged along a lamp unit axis, wherein the projection lens has a reference focus set on the lamp unit axis, and is disposed at such a position rotated downward about the reference focus, and a projection lens axis is directed further downward than the lamp unit axis, the light-shielding member has a reference point set on the lamp unit axis, the projection lens is disposed such that the reference focus is located near the reference point, and the light-shielding member has a light-shielding reference axis line passing through the reference point and orthogonal to a surface provided with the irradiation slit, and is disposed such that a side close to the projection lens of the light-shielding reference axis line is rotated about the reference point so as to be displaced downward, an inclination of the light-shielding reference axis line with respect to the lamp unit axis is smaller than an inclination of the projection lens axis with respect to the lamp unit axis.

* * * * *